(12) United States Patent
Meylan et al.

(10) Patent No.: US 9,736,045 B2
(45) Date of Patent: Aug. 15, 2017

(54) SYSTEMS AND METHODS FOR NETWORK QUALITY ESTIMATION, CONNECTIVITY DETECTION, AND LOAD MANAGEMENT

(75) Inventors: Arnaud Meylan, San Diego, CA (US); Jay Kumar Sundararajan, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 13/612,204

(22) Filed: Sep. 12, 2012

(65) Prior Publication Data

US 2013/0254379 A1 Sep. 26, 2013

Related U.S. Application Data

(60) Provisional application No. 61/535,708, filed on Sep. 16, 2011.

(51) Int. Cl.
*G06F 15/16* (2006.01)
*H04L 12/26* (2006.01)
*H04W 28/24* (2009.01)

(52) U.S. Cl.
CPC .......... *H04L 43/0811* (2013.01); *H04L 43/10* (2013.01); *H04W 28/24* (2013.01); *H04L 43/0864* (2013.01); *H04L 43/0894* (2013.01)

(58) Field of Classification Search
CPC . H04L 43/0894; H04L 43/0864; H04L 43/10; H04L 43/0811; H04W 28/24
USPC ................ 709/223, 226, 203, 224
See application file for complete search history.

(56) References Cited

U.S. PATENT DOCUMENTS 6,091,717 A * 7/2000 Honkasalo .............. H04W 8/26
370/329
6,161,123 A * 12/2000 Renouard et al. ............ 709/203
(Continued)

FOREIGN PATENT DOCUMENTS

CN 1943175 A 4/2007
CN 101056218 A 10/2007
(Continued)

OTHER PUBLICATIONS

International Search Report and Written Opinion—PCT/US2012/055815—ISA/EPO—dated Feb. 7, 2013.
(Continued)

*Primary Examiner* — Bryan Lee
*Assistant Examiner* — Oluwatosin Gidado
(74) *Attorney, Agent, or Firm* — Ashish L. Patel

(57) ABSTRACT

Systems, methods, and devices related to estimating backhaul quality, detecting Internet connectivity, and managing server load are described herein. In some aspects, a wireless device is configured to determine a characteristic of a communication link. The device includes a transmitter configured to transmit a request for a communication from a server. The device further includes a receiver configured to receive the communication from the server, over the communication link, in response to the request. The device further includes a processor configured to compute a target amount of at least one of traffic or time to receive the communication. The processor is further configured to terminate the communication based on the computed time or amount of traffic received. The processor is further configured to determine a characteristic of the communication link based on the communication from the server.

35 Claims, 17 Drawing Sheets

(56) References Cited

U.S. PATENT DOCUMENTS

| | | | |
|---|---|---|---|
| 6,662,223 B1 | 12/2003 | Zhang et al. | |
| 6,983,312 B1* | 1/2006 | O'Neil | H04L 29/12009 455/410 |
| 7,376,398 B2 | 5/2008 | Roy et al. | |
| 7,596,099 B2 | 9/2009 | Ganesan et al. | |
| 7,664,955 B2* | 2/2010 | Newman | H04L 9/0875 380/270 |
| 7,782,767 B1 | 8/2010 | Lin et al. | |
| 7,900,245 B1 | 3/2011 | Geddes et al. | |
| 7,936,713 B2 | 5/2011 | Kubler et al. | |
| 8,036,121 B2 | 10/2011 | Kobayashi | |
| 8,243,663 B2 | 8/2012 | Spinar et al. | |
| 8,441,974 B2 | 5/2013 | Moon et al. | |
| 8,510,025 B2* | 8/2013 | Chan et al. | 701/117 |
| 2002/0165956 A1 | 11/2002 | Phaal | |
| 2002/0174216 A1 | 11/2002 | Shorey et al. | |
| 2003/0126253 A1* | 7/2003 | Ewing et al. | 709/223 |
| 2003/0130924 A1* | 7/2003 | Muldrow | G06Q 40/04 705/37 |
| 2004/0004972 A1* | 1/2004 | Lakshmanamurthy et al. | 370/413 |
| 2004/0078426 A1 | 4/2004 | Nagami et al. | |
| 2004/0196840 A1 | 10/2004 | Amrutur et al. | |
| 2004/0199604 A1* | 10/2004 | Dobbins et al. | 709/217 |
| 2004/0266424 A1 | 12/2004 | Park et al. | |
| 2005/0021737 A1 | 1/2005 | Ellison et al. | |
| 2005/0025163 A1 | 2/2005 | Christie et al. | |
| 2005/0063399 A1 | 3/2005 | Zaitsu | |
| 2005/0154795 A1 | 7/2005 | Kuz et al. | |
| 2005/0238017 A1 | 10/2005 | Delegue et al. | |
| 2006/0084417 A1 | 4/2006 | Melpignano et al. | |
| 2006/0142004 A1 | 6/2006 | He et al. | |
| 2006/0218264 A1 | 9/2006 | Ogawa et al. | |
| 2006/0251026 A1 | 11/2006 | Kalhan | |
| 2006/0280128 A1 | 12/2006 | Abdel-Kader | |
| 2007/0058538 A1 | 3/2007 | Chiang et al. | |
| 2007/0115918 A1 | 5/2007 | Bodin et al. | |
| 2007/0177499 A1 | 8/2007 | Gavrilescu et al. | |
| 2007/0195797 A1 | 8/2007 | Patel et al. | |
| 2007/0208864 A1 | 9/2007 | Flynn et al. | |
| 2007/0293275 A1* | 12/2007 | Kalinichenko | G06Q 10/10 455/567 |
| 2008/0031188 A1 | 2/2008 | Magnusson et al. | |
| 2008/0062875 A1* | 3/2008 | Yamazaki et al. | 370/232 |
| 2008/0080414 A1 | 4/2008 | Thubert et al. | |
| 2008/0137660 A1 | 6/2008 | Olakangil et al. | |
| 2008/0144513 A1 | 6/2008 | Small et al. | |
| 2008/0229024 A1* | 9/2008 | Plamondon | H04L 67/28 711/126 |
| 2008/0293404 A1 | 11/2008 | Scherzer et al. | |
| 2009/0003283 A1 | 1/2009 | Meylan | |
| 2009/0052330 A1 | 2/2009 | Matsunaga et al. | |
| 2009/0064299 A1 | 3/2009 | Begorre et al. | |
| 2009/0124284 A1* | 5/2009 | Scherzer et al. | 455/552.1 |
| 2009/0164611 A1 | 6/2009 | Corda et al. | |
| 2009/0168699 A1 | 7/2009 | Lo | |
| 2009/0219819 A1 | 9/2009 | Haverinen et al. | |
| 2009/0232009 A1 | 9/2009 | Finkelstein et al. | |
| 2009/0253409 A1 | 10/2009 | Slavov et al. | |
| 2009/0257361 A1 | 10/2009 | Deshpande et al. | |
| 2009/0264123 A1* | 10/2009 | Agashe | H04W 48/20 455/434 |
| 2009/0279461 A1 | 11/2009 | Rao et al. | |
| 2009/0279492 A1 | 11/2009 | Montemurro et al. | |
| 2009/0296581 A1* | 12/2009 | Mekkattuparamban et al. | 370/235 |
| 2010/0083121 A1 | 4/2010 | Famolari et al. | |
| 2010/0110921 A1* | 5/2010 | Famolari et al. | 370/252 |
| 2010/0115083 A1* | 5/2010 | Oba et al. | 709/224 |
| 2010/0142465 A1* | 6/2010 | Medepalli et al. | 370/329 |
| 2010/0159843 A1 | 6/2010 | Ikeda et al. | |
| 2010/0284386 A1 | 11/2010 | Ulupinar et al. | |
| 2010/0309878 A1 | 12/2010 | Stolyar et al. | |
| 2010/0317338 A1 | 12/2010 | Ohsawa | |
| 2011/0010761 A1 | 1/2011 | Doyle | |
| 2011/0038274 A1 | 2/2011 | Ikemoto et al. | |
| 2011/0081903 A1 | 4/2011 | Cai et al. | |
| 2011/0105852 A1 | 5/2011 | Morris et al. | |
| 2011/0167478 A1 | 7/2011 | Krishnaswamy et al. | |
| 2011/0201364 A1 | 8/2011 | Capuozzo et al. | |
| 2011/0235546 A1 | 9/2011 | Horn et al. | |
| 2011/0268109 A1 | 11/2011 | Miyata | |
| 2012/0022968 A1 | 1/2012 | Manku | |
| 2012/0026865 A1* | 2/2012 | Fan | H04W 76/02 370/225 |
| 2012/0028627 A1 | 2/2012 | Hunzinger | |
| 2012/0033613 A1 | 2/2012 | Lin et al. | |
| 2012/0284520 A1* | 11/2012 | Newman et al. | 713/171 |
| 2013/0044598 A1* | 2/2013 | Zhang et al. | 370/232 |
| 2013/0044614 A1 | 2/2013 | Aguirre et al. | |
| 2013/0064222 A1 | 3/2013 | Hancock et al. | |
| 2013/0084835 A1 | 4/2013 | Scherzer et al. | |
| 2013/0246575 A1 | 9/2013 | Giaretta | |
| 2013/0250780 A1 | 9/2013 | Meylan et al. | |
| 2013/0254378 A1 | 9/2013 | Meylan | |
| 2013/0279418 A1 | 10/2013 | Scherzer et al. | |
| 2013/0336136 A1 | 12/2013 | Meylan et al. | |
| 2014/0321298 A1 | 10/2014 | Chow et al. | |

FOREIGN PATENT DOCUMENTS

| | | |
|---|---|---|
| CN | 101189895 A | 5/2008 |
| DE | 102007042588 A1 | 3/2009 |
| EP | 1411697 A1 | 4/2004 |
| EP | 1732266 A1 | 12/2006 |
| EP | 2134063 A2 | 12/2009 |
| EP | 2288208 A1 | 2/2011 |
| JP | H0946374 A | 2/1997 |
| JP | 2004015497 A | 1/2004 |
| JP | 2004312569 A | 11/2004 |
| JP | 2006074773 A | 3/2006 |
| JP | 2008160754 A | 7/2008 |
| JP | 2008311795 A | 12/2008 |
| JP | 2009206845 A | 9/2009 |
| JP | 2009267925 A | 11/2009 |
| JP | 2009543500 A | 12/2009 |
| JP | 2009545251 A | 12/2009 |
| JP | 2010154129 A | 7/2010 |
| JP | 2011015190 A | 1/2011 |
| JP | 2011055019 A | 3/2011 |
| JP | 2011147160 A | 7/2011 |
| JP | 2012504380 A | 2/2012 |
| JP | 2012504381 A | 2/2012 |
| JP | 2012191375 A | 10/2012 |
| WO | 9827746 A1 | 6/1998 |
| WO | 9827766 A2 | 6/1998 |
| WO | 2005011173 A2 | 2/2005 |
| WO | 2006028409 A1 | 3/2006 |
| WO | 2007010319 A1 | 1/2007 |
| WO | 2007099414 A1 | 9/2007 |
| WO | 2008126179 A1 | 10/2008 |
| WO | 2009030063 A1 | 3/2009 |
| WO | 2010037128 A1 | 4/2010 |
| WO | 2010037131 A1 | 4/2010 |
| WO | 2010051460 A1 | 5/2010 |
| WO | 2011013064 A1 | 2/2011 |
| WO | 2011061933 A1 | 5/2011 |
| WO | 2011069119 | 6/2011 |
| WO | 2011083801 A1 | 7/2011 |
| WO | 2011084945 A1 | 7/2011 |

OTHER PUBLICATIONS

Qualcomm: "A 3G/LTE Wi-Fi Offload Framework: Connectivity Engine (CnE) to Manage Inter-System Radio Connections and Applications", Jun. 1, 2011 (Jun. 1, 2011), XP055051075, Retrieved from the Internet: URL:http://www.qualcomm.com/media/documents/files/qualcomm-research-3g-lte-wifi-off-load-framework.pdf [retrieved on Jan. 24, 2013].

(56) References Cited

OTHER PUBLICATIONS

Universal Mobile Telecommunications System (UMTS); Introduction of the Multimedia Broadcast/Multicast Service (MBMS) in the Radio Access Network (RAN); Stage 2 (3GPP TS 25.346 version 7.7.0 Release 7); ETSI TS 125 346, IEEE, LIS, Sophia Antipolis Cedex, France, vol. 3-R2, No. V7.7.0, Apr. 1, 2008 (Apr. 1, 2008), XP014041744, pp. 1-65.

Ruolin L., et al.,"Design and Implementation of Traffic Flow Measurement Infrastructure Based on Libpcap", Application Research of Computers, vol. 10, 2006, Oct. 31, 2006, pp. 219-222.

* cited by examiner

SYSTEMS AND METHODS FOR NETWORK QUALITY ESTIMATION, CONNECTIVITY DETECTION, AND LOAD MANAGEMENT

CROSS-REFERENCE TO RELATED APPLICATIONS

The present application claims priority benefit under 35 U.S.C. §119(e) to U.S. Provisional Patent Application Ser. No. 61/535,708, filed Sep. 16, 2011, the entire contents of which are incorporated by reference and should be considered a part of this specification. The present application is related to U.S. patent application Ser. Nos. 13/611,990, 13/612,066, 13/612,125 and 13/612,277, all of which are entitled "SYSTEMS AND METHODS FOR NETWORK QUALITY ESTIMATION, CONNECTIVITY DETECTION, AND LOAD MANAGEMENT," filed on even date herewith, and assigned to the same assignee hereof, the entire contents of all of which are incorporated by reference and should be considered a part of this specification.

BACKGROUND

Field

The present application relates generally to wireless communications, and more specifically to systems, methods, and devices for managing network quality estimation.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The speed at which devices transfer information may vary between different partner devices and/or different wireless networks. Accordingly, improved systems, methods, and devices for estimating network speed, detecting connectivity, and management thereof are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include estimating network speed and/or Internet connectivity in conjunction with receipt of network access information, thereby decreasing the transfer of unused data.

An aspect of the subject matter described in the disclosure provides method of determining a characteristic of a communication link. The method includes transmitting, at a mobile device, a first request for a first communication for determining suitability of the communication link, to a server. The method further includes receiving the first communication from the server, in response to the first request. The first communication is received over the communication link. The method further includes determining suitability of the communication link based on the first communication. The method further includes storing information identifying the determined suitability of a plurality of networks. The method further includes selectively transmitting a second request for a second communication, over the communication link. The selectively transmitting is based on the stored information.

Another aspect of the subject matter described in the disclosure provides a wireless device configured to determine a characteristic of a communication link. The device includes a transmitter configured to transmit a first request for a first communication for determining suitability of the communication link. The transmitter is configured to transmit the first request to a server. The device further includes a receiver configured to receive the first communication from the server in response to the first request. The receiver is configured to receive the first communication over the communication link. The device further includes a processor configured to determine suitability of the communication link based on the first communication. The device further includes a memory configured to store information identifying the determined suitability of a plurality of networks. The transmitter is further configured to selectively transmit a second request for a second communication, over the communication link. The selectively transmitting is based on the stored information.

Another aspect of the subject matter described in the disclosure provides an apparatus for determining a characteristic of a communication link. The apparatus includes means for transmitting a first request for a first communication to a server. The first communication is for determining suitability of the communication link. The apparatus further includes means for receiving the first communication from the server in response to the first request. The first communication is received over the communication link. The apparatus further includes means for determining suitability of the communication link based on the first communication. The apparatus further includes means for storing information identifying the determined suitability of a plurality of networks. The apparatus further includes means for selectively transmitting a second request for a second communication, over the communication link. The selectively transmitting is based on the stored information.

Another aspect of the subject matter described in the disclosure provides a non-transitory computer-readable medium. The medium includes code that, when executed, causes an apparatus to transmit, a first request for a first communication for determining suitability of a communication link. The first request is transmitted to a server. The medium further includes code that, when executed, causes the apparatus to receive the first communication from the server, over the communication link, in response to the first request. The medium further includes code that, when executed, causes the apparatus to determine suitability of the communication link based on the first communication. The medium further includes code that, when executed, causes the apparatus to store information identifying the determined suitability of a plurality of networks. The medium further includes code that, when executed, causes the apparatus to selectively transmit a second request for a second communication, over the communication link. The selectively transmitting is based on the stored information.

Another aspect of the subject matter described in the disclosure provides a method of determining a characteristic of an active communication link. The method includes determining an allowability for accessing a server, via the active communication link, based on a first access restriction. The method further includes transmitting a request for a communication from the server upon allowability for accessing. The method further includes receiving the communication from the server, over the communication link, in response to the request. The method further includes determining a characteristic of the communication link based on the communication from the server.

Another aspect of the subject matter described in the disclosure provides a wireless device configured to determine a characteristic of an active communication link. The device includes a processor configured to determine an allowability for accessing a server, via the active communication link, based on a first access restriction. The device further includes a transmitter configured to transmit a request for a communication from the server upon allowability for accessing. The device further includes a receiver configured to receive the communication from the server, over the communication link, in response to the request. The processor is further configured to determine a characteristic of the communication link based on the communication from the server.

Another aspect of the subject matter described in the disclosure provides an apparatus for determining a characteristic of an active communication link. The apparatus includes means for determining an allowability for accessing a server, via the active communication link, based on a first access restriction. The apparatus further includes means for transmitting a request for a communication from the server upon allowability for accessing. The apparatus further includes means for receiving the communication from the server, over the communication link, in response to the request. The apparatus further includes means for determining a characteristic of the communication link based on the communication from the server.

Another aspect of the subject matter described in the disclosure provides another non-transitory computer-readable medium. The medium includes code that, when executed, causes an apparatus to determine an allowability for accessing a server, via an active communication link, based on a first access restriction. The medium further includes code that, when executed, causes the apparatus to transmit a request for a communication from the server upon allowability for accessing. The medium further includes code that, when executed, causes the apparatus to receive the communication from the server, over the communication link, in response to the request. The medium further includes code that, when executed, causes the apparatus to determine a characteristic of the communication link based on the communication from the server.

Another aspect of the subject matter described in the disclosure provides a method of detecting connectivity to a server through an access point. The method includes generating, at a wireless device, a connection detection request including a token. The method further includes transmitting, at the wireless device, via the access point, the connection detection request addressed to a server. The method further includes waiting for a connection detection response from the server. The method further includes determining whether a received connection detection response includes the token.

Another aspect of the subject matter described in the disclosure provides a method of communicating in a wireless network. The method includes determining a network connectivity of at least one communication link as acceptable or unacceptable. The method further includes transmitting a first subset of data over communication links with unacceptable network connectivity. The method further includes transmitting a second subset of data over communication links with acceptable network connectivity.

Another aspect of the subject matter described in the disclosure provides a wireless device configured to detect connectivity to a server through an access point. The device includes a processor configured to generate a connection detection request including a token. The device further includes a transmitter configured to transmit, via the access point, the connection detection request addressed to a server. The processor is further configured to wait for a connection detection response from the server. The processor is further configured to determine whether a received connection detection response includes the token.

Another aspect of the subject matter described in the disclosure provides a wireless device configured to communicate in a wireless network. The device includes a processor configured to determine a network connectivity of at least one communication link as acceptable or unacceptable. The device further includes a transmitter configured to transmit a first subset of data over communication links with unacceptable network connectivity. The transmitter is further configured to transmit a second subset of data over communication links with acceptable network connectivity.

Another aspect of the subject matter described in the disclosure provides an apparatus for detecting connectivity to a server through an access point. The apparatus includes means for generating a connection detection request including a token. The apparatus further includes means for transmitting, via the access point, the connection detection request addressed to a server. The apparatus further includes means for waiting for a connection detection response from the server. The apparatus further includes means for determining whether a received connection detection response includes the token.

Another aspect of the subject matter described in the disclosure provides an apparatus for communicating in a wireless network. The apparatus includes means for determining a network connectivity of at least one communication link as acceptable or unacceptable. The apparatus further includes means for transmitting a first subset of data over communication links with unacceptable network connectivity. The apparatus further includes means for transmitting a second subset of data over communication links with acceptable network connectivity.

Another aspect of the subject matter described in the disclosure provides another non-transitory computer-readable medium. The medium includes code that, when executed, causes an apparatus to generate a connection detection request including a token. The medium further includes code that, when executed, causes the apparatus to transmit, via an access point, the connection detection request addressed to a server. The medium further includes code that, when executed, causes the apparatus to wait for a connection detection response from the server. The medium further includes code that, when executed, causes the apparatus to determine whether a received connection detection response includes the token.

Another aspect of the subject matter described in the disclosure provides another non-transitory computer-readable medium. The medium includes code that, when executed, causes an apparatus to determine a network connectivity of at least one communication link as acceptable or unacceptable. The medium further includes code that, when executed, causes the apparatus to transmit a first subset of data over communication links with unacceptable network connectivity. The medium further includes code that, when executed, causes the apparatus to transmit a second subset of data over communication links with acceptable network connectivity.

Another aspect of the subject matter described in the disclosure provides another method of determining a characteristic of a communication link. The method includes transmitting, at a mobile device, a request for a communication from a server. The method further includes receiving the communication from the server, over the communication link, in response to the request. The method further includes computing a target amount of at least one of traffic or time to receive the communication. The method further includes terminating the communication based on the computed time or amount of traffic received. The method further includes determining a characteristic of the communication link based on the communication from the server.

Another aspect of the subject matter described in the disclosure provides another wireless device configured to determine a characteristic of a communication link. The device includes a transmitter configured to transmit a request for a communication from a server. The device further includes a receiver configured to receive the communication from the server, over the communication link, in response to the request. The device further includes a processor configured to compute a target amount of at least one of traffic or time to receive the communication. The processor is further configured to terminate the communication based on the computed time or amount of traffic received. The processor is further configured to determine a characteristic of the communication link based on the communication from the server.

Another aspect of the subject matter described in the disclosure provides another apparatus for determining a characteristic of a communication link. The apparatus includes means for transmitting a request for a communication from a server. The apparatus further includes means for receiving the communication from the server, over the communication link, in response to the request. The apparatus further includes means for computing a target amount of at least one of traffic or time to receive the communication. The apparatus further includes means for terminating the communication based on the computed time or amount of traffic received. The apparatus further includes means for determining a characteristic of the communication link based on the communication from the server.

Another aspect of the subject matter described in the disclosure provides another non-transitory computer-readable medium. The medium includes code that, when executed, causes an apparatus to transmit a request for a communication from a server. The medium further includes code that, when executed, causes the apparatus to receive the communication from the server, over a communication link, in response to the request. The medium further includes code that, when executed, causes the apparatus to compute a target amount of at least one of traffic or time to receive the communication. The medium further includes code that, when executed, causes the apparatus to terminate the communication based on the computed time or amount of traffic received. The medium further includes code that, when executed, causes the apparatus to determine a characteristic of the communication link based on the communication from the server.

Another aspect of the subject matter described in the disclosure provides a method of estimating a quality of a communication link. The method includes receiving data units via a network interface. The method further includes monitoring the received data units at the network interface. The method further includes determining, for each data unit received via the network interface, whether the data unit originated from a local area network or a non-local network. The method further includes computing a characteristic of the communication link based on data units originating from a non-local network.

Another aspect of the subject matter described in the disclosure provides a wireless device configured to estimate a quality of a communication link. The device includes network interface configured to receive data units. The device further includes a processor configured to monitor the received data units at the network interface. The processor is further configured to determine, for each data unit received via the network interface, whether the data unit originated from a local area network or a non-local network. The processor is further configured to compute a characteristic of the communication link based on data units originating from a non-local network.

Another aspect of the subject matter described in the disclosure provides an apparatus for estimating a quality of a communication link. The apparatus includes means for receiving data units via a network interface. The apparatus further includes means for monitoring the received data units at the network interface. The apparatus further includes means for determining, for each data unit received via the network interface, whether the data unit originated from a local area network or a non-local network. The apparatus further includes means for computing a characteristic of the communication link based on data units originating from a non-local network.

Another aspect of the subject matter described in the disclosure provides another non-transitory computer-readable medium. The medium include code that, when executed, causes an apparatus to receive data units via a network interface. The medium further includes code that, when executed, causes the apparatus to monitor the received data units at the network interface. The medium further includes code that, when executed, causes the apparatus to determine, for each data unit received via the network interface, whether the data unit originated from a local area network or a non-local network. The medium further includes code that, when executed, causes the apparatus to compute a characteristic of a communication link based on data units originating from a non-local network.

DETAILED DESCRIPTION

Figure 1:
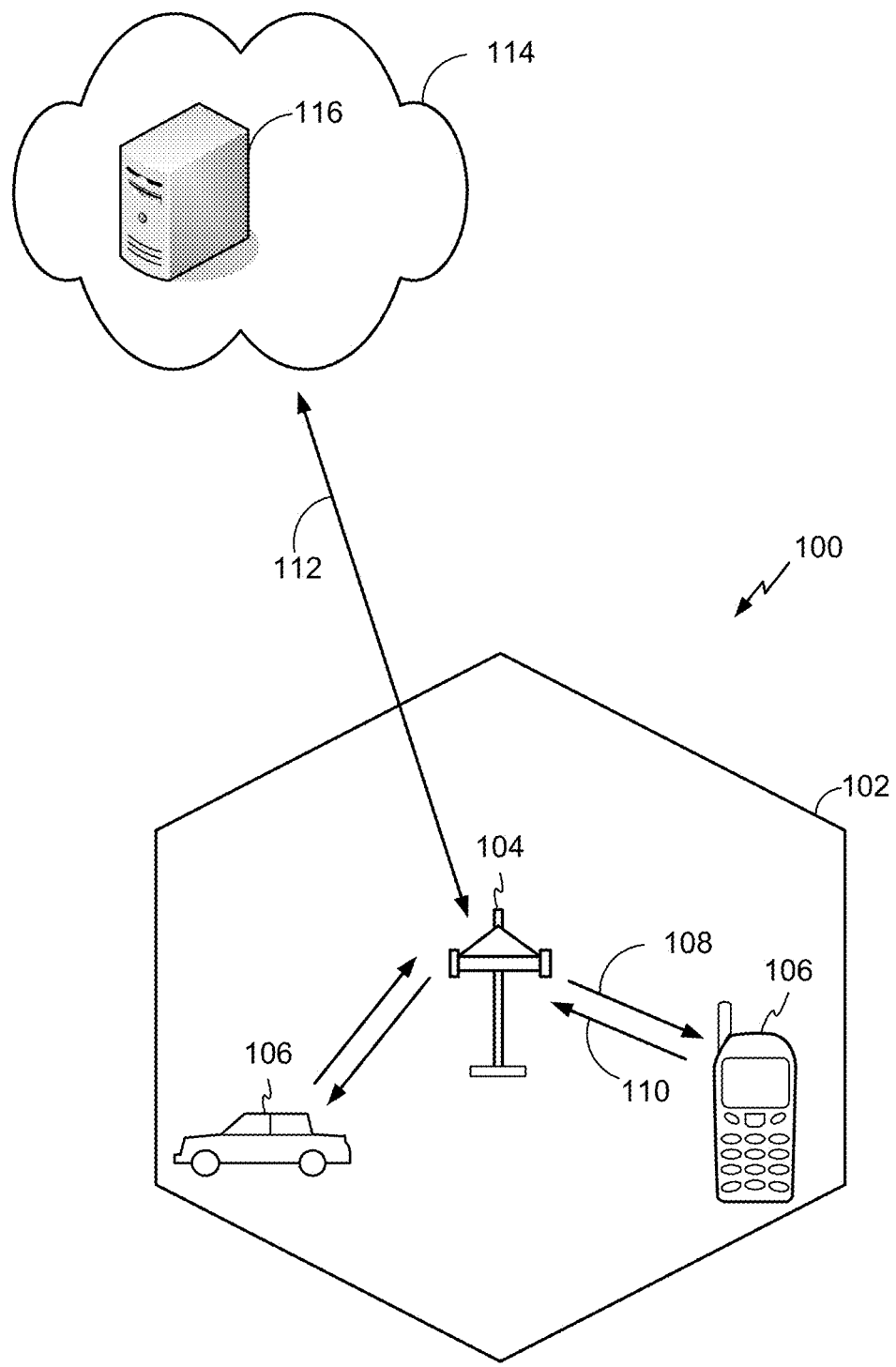
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE family of wireless protocols. For example, the various aspects described herein may be used as part of the IEEE 802.11n protocol.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11n) compliant wireless link to obtain general connectivity to the Internet or to other wide area networks. The AP may interconnect with the Internet or with other wide area networks over a link that may be referred to as a backhaul. In some implementations an STA may also be used as an AP.

An access point ("AP") may also include, be implemented as, or known as a NodeB, eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure may be employed. The wireless communication system 100 may operate pursuant to a wireless standard, for example the 802.11n standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In the illustrated embodiment, the AP 104 uses a backhaul communication link 112, to communicate with a larger network 114. The network 114 may be, for example the Internet or a public switched telephone network (PSTN). The backhaul may comprise several physical links. In an embodiment, the STA 106 may communicate with a server 116 via the AP 104. For example, the STA 106 may communicate with the AP 104 via the uplink 110 and the downlink 108, and the AP 104 may relay the communication to the server 116 via the backhaul communication link 112.

Backhaul Quality Estimation (BQE)

In an embodiment, the STA 106 may estimate a quality of the end-to-end link with the server 116. The end-to-end link may include, for example, the uplink 110, the downlink 108, and the backhaul communication link 112. Accordingly, the STA 106 may estimate the quality of the end-to-end link as the cumulative quality of the uplink 110, the downlink 108, and/or the backhaul communication link 112. The STA 106 may measure quality of the end-to-end link as a measurement of, for example, transfer speed, latency, packet delay variation, packet loss, etc. In embodiments where the quality of the backhaul communication link 112 is lower than that of the uplink 110 and/or the downlink 108, the quality of the end-to-end link may be limited by the quality of the backhaul communication link 112. Conversely, in embodiments where the quality of the backhaul communication link 112 is higher than that of the uplink 110 and/or the downlink 108, the quality of the end-to-end link may be limited by the quality of the uplink 110 and/or the downlink 108. Accordingly, in some embodiments, the STA 106 may effectively estimate a quality of the backhaul communication link 112. Estimation of the quality of one or more aspects of the end-to-end link may be referred to herein as "backhaul quality estimation" (BQE).

In an embodiment, the STA 106 may estimate the quality of the end-to-end link with the server 116, for example, by requesting a file from the server 116. Specifically, the STA 106 may send a quality estimation request to the server 116. The server 116 may send, to the STA 106, a quality estimation response including data referred to herein as a file. Although the STA 106 is described herein as downloading a "file" from the server 116, it will be appreciated that the quality estimation response need not be static. In an embodiment, the STA 106 may dynamically generate the quality estimation response.

In embodiments where the quality of the end-to-end link includes the speed of the end-to-end link, the STA 106 may estimate the speed of the end-to-end link by measuring the amount of time it takes to download the quality estimation response from the server 116 and dividing the size of the quality estimation response by the transfer time. In embodiments where the quality of the end-to-end link includes the latency of the end-to-end link, the STA 106 may estimate the latency of the end-to-end link by measuring the amount of time it takes for the server to respond to a download request. In embodiments where the quality of the end-to-end link includes the packet delay variation of the end-to-end, the STA 106 may estimate the packet delay variation of the end-to-end link by monitoring the transmission of packets and acknowledgments when downloading the quality estimation response. In embodiments where the quality of the end-to-end link includes the packet loss rate of the end-to-end link, the STA 106 may estimate the packet loss rate of the end-to-end link by measuring the number of packets resent by the server 116 when downloading the quality estimation response.

In one embodiment, the quality estimation response may include random data, pseudo-random data, null data, or data relevant to the current state of the STA 106. The quality estimation response may include data not intended to convey new information to the STA 106. Accordingly, the quality estimation response may be referred to as a "dummy file." The STA 106 may discard or delete the data in the dummy file without use. For example, the STA 106 may not use the data in the dummy file in an application, and may not present the data via a user interface. In another embodiment, the file is processed by the STA 106 and provides information relevant to the context or state of the STA 106.

In an embodiment, the server 116 may cache the quality estimation response. For example, the server 116 may be part of a content delivery network (CDN) such as, for example, the Akamai® Content Delivery Network provided by Akamai Technologies, Inc., Cambridge, Mass. The CDN may cache the quality estimation response at one of a plurality of servers in different geographical locations, and quality estimation requests may be routed to the server nearest the STA 106. As used herein, the server 116 may refer to either a standalone server or a server operating in conjunction with a CDN.

In an embodiment, the quality estimation response may be of a size sufficient for the STA 106 to measure the quality of the end-to-end link. For example, the quality estimation response may be between about 0 bits and about 2 megabits in size. In an embodiment, the quality estimation response may between about 0.5 megabits and about 1.5 megabits in size, and more particularly, about 1 megabit in size. In an embodiment, the quality estimation response size may be based on a round trip time (RTT) of packets between the STA 106 and the server 116. For example, the quality estimation response may be related to the RTT based on Table 1, below.

TABLE 1

| Value of RTT (seconds) | Quality Estimation Response (megabits) |
|---|---|
| 0.02 | 0.18 |
| 0.03 | 0.18 |
| 0.04 | 0.37 |
| 0.05 | 0.37 |
| 0.10 | 0.76 |
| 0.15 | 0.76 |
| 0.20 | 1.52 |

Because the STA 106 may estimate the quality of the end-to-end link frequently, such as every time the STA 106 connects to an AP, the quality estimation response may consume significant bandwidth over time. The bandwidth used by the STA 106 when downloading the quality estimation response may count towards a bandwidth quota associated with the STA 106. Accordingly, it may be desirable for the quality estimation response to contain useful data instead of dummy data. Useful data may include, for example, data not already available to the STA 106, data for use by an application on the STA 106, data to be presented via a user interface of the STA 106, and/or device management information. Device management information may include, for example, an access probability factor, a quality estimation quota, a BQE cache period, a BQE history limit, a passive BQE command, and/or other information. The device management information may include an access restriction.

A large number of STAs may be configured to send quality estimation requests from the server 116. As the number of quality estimation requests sent to the server 116 increases, the processing load and/or network bandwidth load on the server 116 may increase. In some embodiments, the number of quality estimation requests may exceed the capabilities of the server 116. The server 116 may manage the volume of quality estimation requests by sending device management information to the STA 106. The device management information may indicate conditions under which the server 116 is available for BQE.

Figure 2:
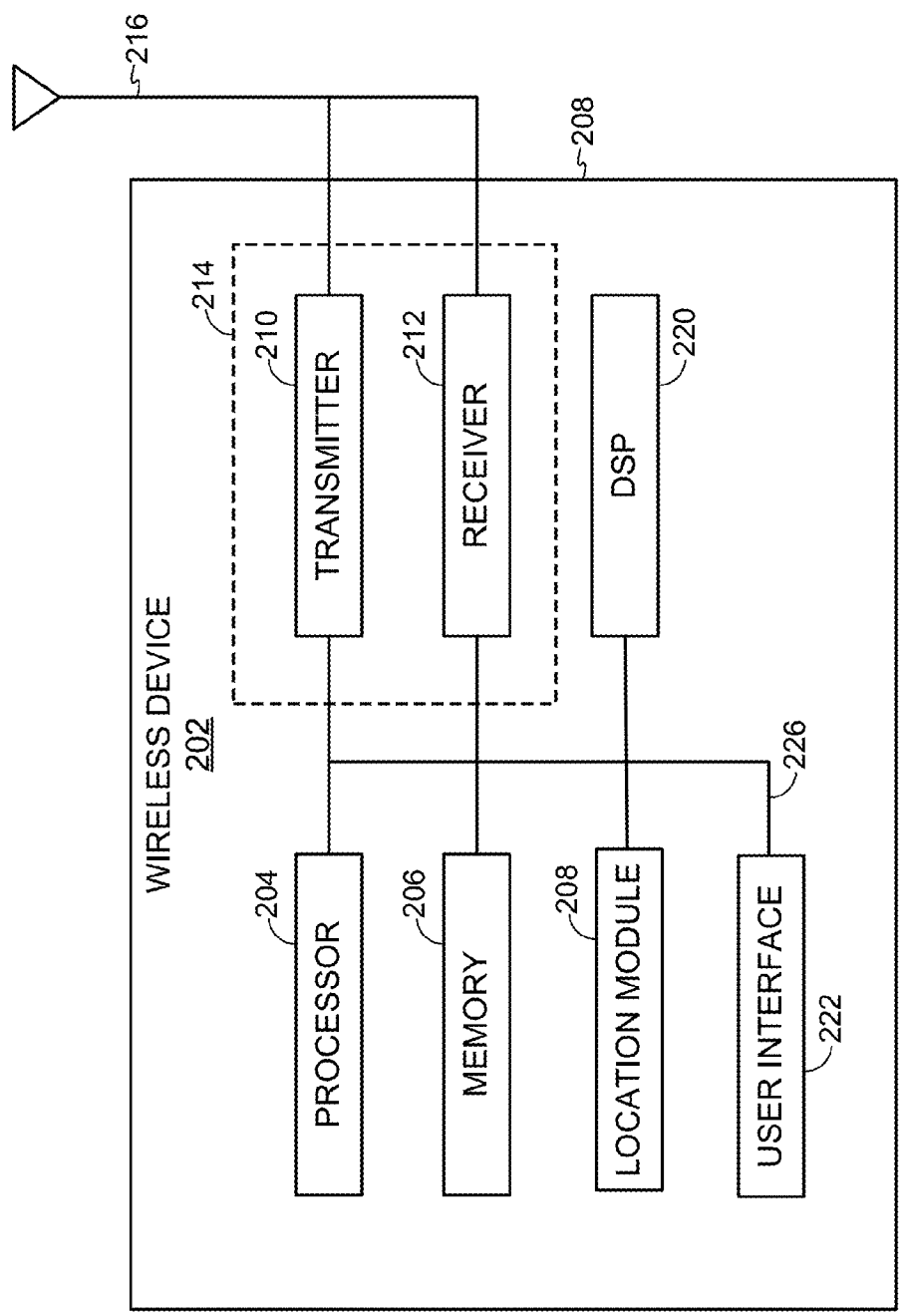
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 may include a processor 204, a memory 206, a housing 208, a transmitter 210 and a receiver 212 (which may form a transceiver 214), an antenna 216, a location module 218, a digital signal processor (DSP) 220, a user interface 222, and a communication bus 226. The wireless device 202 is an example of a device that may be configured to implement the various methods described herein. For example, the wireless device 202 may comprise the AP 104 and/or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to transmit the quality estimation request, as discussed above, and to associate with various APs. The receiver 212 may be configured to receive the quality estimation response, as discussed above, and to monitor the availability of various APs.

The wireless device 202 may also include a location module 218 that may be used to determine a location of the wireless device 202. The location module 218 may determine the location of the wireless device 202 based on, for example, the global positioning system (GPS), assisted global positioning system (AGPS), cellular triangulation, IP-based location awareness techniques, etc. The location module 218 may determine the location of the wireless device 202 in conjunction with the receiver 212, the antenna 216, the processor 204, the memory 206, and/or the DSP 220. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user. In an embodiment, the user interface 222 may display the wireless network map to the user and may receive an instruction to associate with a different AP based on the wireless network map.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as an AP, it is hereinafter referred to as a wireless device 202a. Similarly, when the wireless device 202 is configured as a STA, it is hereinafter referred to as a wireless device 202s. A device in the wireless communication system 100 may implement only functionality of a transmitting node, only functionality of a receiving node, or functionality of both a transmitting node and a receive node.

Active BQE

In an embodiment, the processor 204 is configured to estimate the quality of a communication link. For example, in embodiments where the wireless device 202s comprises the STA 106, the processor 204 may estimate the quality of the end-to-end link between the STA 106 and the server 116 via BQE. In an embodiment, the processor 204 may intermittently attempt BQE. In an embodiment, the processor 204 may attempt BQE every time the wireless device 202s connects to a communication network. For example, the processor 204 may attempt BQE every time the wireless device 202s associates with an AP, such as the AP 104. In another embodiment, the processor 204 may attempt BQE at regular or irregular intervals.

When attempting BQE, the processor 204 may determine whether the server 116 is available for BQE. In an embodiment, the processor 204 may determine whether the server 116 is available for BQE based on device management information received from the server 116. If the processor 204 determines that the server 116 is available for BQE, the BQE attempt may be said to succeed. If the processor 204 determines that the server 116 is not available for BQE, the BQE attempt may be said to fail, or abort. When the BQE attempt succeeds, the processor 204 may generate a quality estimation request, transmit the quality estimation request, receive a quality estimation response, calculate a quality metric for the communication link based on the response to the quality estimation request, report the quality metric to the server, and store the response in the memory 206. Bandwidth quality estimation involving the server 116 may be referred to as "active BQE."

In an embodiment, the processor 204 generates a quality estimation request when the server 116 is available for BQE. In an embodiment, the quality estimation request may include a hypertext transport protocol (HTTP) GET request. In another embodiment, the quality estimation report may include an HTTP POST request including the quantized location. In various embodiments, the quality estimation request may take other forms.

In an embodiment, the processor 204 may cause the transmitter 210 to transmit the quality estimation request to the server 116 via the antenna 216. The processor may receive a response from the server 116 via the receiver 212. The response may include the device management information. In an embodiment, the processor 204 may generate and transmit a quality estimation request on a periodic basis, every time the wireless device 202s connects to a new wireless network, or based on various other criteria.

When receiving the quality estimation response from the server 116, the processor 204 may calculate a quality metric based on the response. The quality metric can include communication statistics, and can be referred to as a BQE result. For example, the processor 204 may estimate the speed of the communication link by measuring the amount of time it takes to receive a number of bytes and dividing the size of the quality estimation response by the transfer time. The bytes may be received from the server 116 or any other host transmitting to the wireless device 202. The processor 204 may estimate the latency of the communication link by measuring the amount of time it takes for the server to respond to the quality estimation request. The processor 204 may estimate the packet delay variation of the communication link by monitoring the transmission of packets and acknowledgments when receiving the response. The processor 204 may estimate the packet loss rate of the communication link by measuring the number of packets resent by the server 116 when receiving the response.

In an embodiment, the processor 204 may calculate an "srate" metric during active BQE. The srate may be used as an aggregate metric reflecting a qualitative user experience by measuring the mean rate during a time period. The time period can include a DNS query time (if applicable), a TCP connection setup time, a TCP slow start time, and TCP congestion avoidance time. The processor 204 may maintain a BQE counter, which may be incremented at the start of each active BQE. The processor 204 may compute a file size to request and determine a BQE timeout indicating a maximum time during which the BQE response should be downloaded. In an embodiment, the processor 204 collects information about the AP 104, such as the Basic Service Set Identifier (BSSID) of the AP 104.

In an embodiment, the processor 204 may compute the file size based on one or more of: a maximum bandwidth (MBW), a round trip time (RTT), a maximum segment size (MSS), a number of parallel streams (NPS), and a ratio of a time spent in congestion avoidance to a time spent in TCP slow start (cong2slow). In an embodiment, the server 116 can send the MBW to the STA 106 in order to convey the maximum bandwidth that the STA 106 should attempt to measure according to current operations policies. In an embodiment, the STA 106 can receive the MBW from the server 116 during an Internet connection detection (ICD). During ICD, described below with respect to FIG. 5, the STA 116 can detect whether the AP 104 provides Internet connectivity. In an embodiment, the STA 106 can store the received MBW and/or a default MBW in the memory 206.

In an embodiment, the processor 204 may estimate the RTT to the server 116 in order to adapt the amount of BQE traffic to the network latency conditions. In an embodiment, the processor 204 may use a default RTT value when an estimated RTT value is not available. In an embodiment, the processor 204 may estimate the RTT in conjunction with an ICD transmission, described below with respect to FIG. 5. In an embodiment, the processor 204 may estimate the RTT based on any Internet host. In an embodiment, the processor 204 may use another Internet host for RTT estimation only when the server 116 is not available.

When computing the file size, the processor 204 may determine a total traffic value equal to: $NPS*(2^R-1)*MSS+MBW*T*cong2slow$. As discussed above, NPS is the number of parallel TCP streams used for BQE. R is the number of RTTs sufficient for the transport protocol to hit a peak rate. In an embodiment, R=max(1, log 2(MBW*RTT/(N*MSS)). MSS is the maximum segment size used by the transport protocol. MBW is the maximum bandwidth that BQE attempts to estimate. T is the elapsed time sufficient for the transport protocol to hit the peak rate. In an embodiment, T=RTT*R. In an embodiment, the file size is the smallest allowed size that is at least equal to the determined total traffic value. In an embodiment the transport protocol is TCP.

In an embodiment, the processor 204 may compute the BQE timeout based on one or more of: the a ratio of a time spent in congestion avoidance to a time spent in TCP slow start (cong2slow), the elapsed time sufficient for the download to hit the peak rate (T), and/or a provisioned time for a DNS query to resolve (dns_rtt). When an RTT estimation to the server 116 is available, the processor 204 may determine that the DNS for the ICD/BQE server is in the local DNS cache and may not provision time to resolve DNS during BQE. Thus, the processor 204 may set dns_rtt=0. When an RTT estimation to the server 116 is not available, the processor 204 may set dns_rtt=2*RTT. In an embodiment, the processor 204 may compute the BQE timeout as (cong2slow+1)*T+dns_rtt.

In an embodiment, the processor 204 generates a URI for a BQE request based on the file size and the information about the AP 104. In an embodiment, the processor binds the socket used for the BQE request (for example, an HTTP transmission) to a Wireless Local Area Network (WLAN) interface. The processor 204 can submit the BQE request via an HTTP GET for the generated URI. In an embodiment, the processor 204 can start a BQE timer based on the BQE timeout and begin estimating the srate.

In an embodiment the processor 204 may compute the srate based on a number of downloaded bytes and an elapsed download time. In an embodiment, the processor 204 may monitor the number of bytes downloaded from non-local hosts at a network interface level. The processor 204 may periodically update a byte counter. In an embodiment, the processor 204 may monitor only bytes received over a radio interface.

In an embodiment, the processor 204 may determine that BQE is successful if an HTTP exception occurs during transmission of the BQE request. For example, the processor 204 may determine that BQE is successful if one or more of the following are received: SC_INTERNAL_SERVER_ERROR, SC_NOT_FOUND, SC_SERVICE_UNAVAILABLE, and SC_UNAUTHORIZED. In an embodiment, the processor 204 may not store the computed rate in the memory 206 if BQE is determined to be successful due to an HTTP exception.

In an embodiment, the processor 204 may monitor the number of bytes received while downloading. When the number of bytes received during the active BQE is equal or greater than the computed file size, the processor 204 may terminate the active BQE download. In an embodiment, the processor 204 may terminate the ongoing HTTP GET via, for example, a socket shutdown or an HTTP library. The processor 204 may send a TCP FIN and/or a TCP RST packet when terminating the download.

In an embodiment, the processor 204 may monitor the BQE timer during the active BQE. When the BQE timer indicates that the duration of the active BQE is equal to or greater than the BQE timeout threshold, the processor 204 may terminate the active BQE download. In an embodiment, the processor 204 may terminate the ongoing HTTP GET via, for example, a socket shutdown or an HTTP library. The processor 204 may send a TCP FIN packet. In various embodiments, the BQE timer can count down from, or count up to, the BQE timeout. In an embodiment, the processor 204 may stop the BQE download based on a combination of the number of bytes received and the BQE timer.

In an embodiment, the processor 204 can compute a BQE metric based on the active BQE download. The processor 204 may compare the BQE metric to a BQE threshold. The BQE threshold may indicate a minimum quality that a communication link must meet in order for the wireless device 202 to use it. In an embodiment, the processor 204 may determine that the communication link 112 is of sufficient quality when the BQE metric is greater than or equal to the BQE threshold. In an embodiment, the processor 204 may determine that the communication link 112 is of insufficient quality when the BQE metric is less than the BQE threshold.

In an embodiment, the processor 204 may upload one or more piece of BQE information to the server 116 after BQE. For example, the processor 204 may upload the computed srate to the server 116 when the processor 204 determines that the communication link 112 is of sufficient quality. In an embodiment, the processor 204 may only upload the BQE information when the processor determines that the communication link 112 provides access to the Internet. In an embodiment, the processor 204 may store the BQE information in the memory 206 when the communication link 112 is of sufficient quality.

In an embodiment, the processor 204 may discard the BQE result without uploading the BQE information to the server 116, when the processor 204 determines that the communication link 112 is of insufficient quality and/or the processor 204 determines that the communication link 112 does not provide Internet access. In an embodiment, the processor 204 may not store the BQE information in the memory 206 when the communication link 112 is of insufficient quality. In an embodiment, the processor 204 may not store the BQE information in the memory 206 when the processor 204 cannot determine one or more identifiers for the AP 104 such as, for example, a Service Set ID (SSID).

In an embodiment, the processor 204 may store the response in the memory 206 after receiving it from the server 116 via the receiver 212. In various embodiments, the processor 204 may use the information in the quality estimation response for a variety of purposes other than quality estimation. For example, in embodiments where the response includes device management information, the processor 204 may store the device management information in the memory 206 for later use in determining availability of the server 116 for BQE.

Passive BQE

In an embodiment, the quality estimation is a passive BQE. A passive BQE command may include information indicating that the processor 204 should not send a quality estimation request to the server 116. BQE without contacting the server 116 may be referred to as "passive BQE." In an embodiment, when the processor 204 attempts BQE, the processor 204 can perform passive BQE by monitoring network traffic over the transmitter 210 and/or the receiver 212 without sending a quality estimation request to the server 116.

In embodiments where the processor 204 performs passive BQE, the processor 204 may estimate the speed of a link with by measuring the amount of time it takes to transfer data to or from a server and dividing the amount of transferred data by the transfer time. In another embodiment, the processor 204 may estimate the latency of the link with a server by measuring the amount of time it takes for the server to respond to a communication. In another embodiment, the processor 204 may estimate the packet delay variation of the link with a server by monitoring the transmission of packets and acknowledgments. In another embodiment, the processor 204 may estimate the packet loss rate of the link with a server by measuring the number of packets resent by the server when downloading the quality estimation response. In an embodiment, during passive BQE, the processor 204 monitors and/or measures only communications not initiated for the purpose of BQE and with a destination across the backhaul 112.

In an embodiment, the processor 204 may perform passive BQE using one or more techniques described above with respect to active BQE. For example, the processor 204 may perform active BQE techniques without sending a download request to the server 116. Instead of monitoring bytes downloaded from the server 116, the processor 204 may monitor bytes downloaded from one or more other Internet servers. The processor 204 may monitor the downloaded bytes using the aforementioned sampling mode, burst mode, srate computation, etc. In an embodiment, the processor 204 may only monitor non-local traffic for passive BQE. In an embodiment the processor may only monitor unicast traffic and exclude broadcast and unicast traffic. In an embodiment, the processor 204 may exclude periods during which no bytes have been received in computing the srate and/or the bust bitrate. In another embodiment, the processor 204 may measure all traffic received at the network layer, and may compute the average of the highest N bitrate samples, where N is an integer. In an embodiment, the processor 204 may perform passive BQE upon connection of the STA 106 to the AP 104, and may only perform passive BQE for a limited period of time thereafter.

In an embodiment, the processor 204 may calculate the srate according to a sampling interval and a burst duration. In an embodiment, the sampling interval can indicate how often the processor 204 checks the byte counter. The burst duration can indicate a duration over which the processor 204 should calculate a bitrate. The burst duration may be specified as a multiple of the sampling interval. In an embodiment, the STA 106 may receive the burst duration and/or the sampling interval from the server 116. In an embodiment, the STA 106 may store the burst duration and/or the sampling interval in the memory 206.

In an embodiment, at each sampling interval, the processor 204 may compute the number of bytes received in that interval. When periodically computing the number of bytes received, the processor 204 may be in a sampling mode. When processor 204 determines that at least one byte has been received, the processor 204 may enter a burst mode.

In the burst mode, the processor 204 may compute the number of bytes received during the duration of the burst. The processor 204 may calculate a burst rate equal to then number of bytes received during the burst divided by the duration of the burst. During srate computation, the processor 204 may calculate the srate as 8 times the number of bytes received across one or more bursts, divided by the time elapsed across the one or more bursts.

In an embodiment, the memory 206 may store a pre-set passive BQE command. In another embodiment, the processor 204 may generate the passive BQE command based on, for example, historical BQE results, a battery level, etc. In another embodiment, the processor 204 may retrieve the passive BQE command via the receiver 212 and store the passive BQE command in the memory 206. In an embodiment, the processor 204 may receive the passive BQE command from the server 116 in response to a quality estimation request. The passive BQE command may be included in the quality estimation response. In various embodiments, the processor 204 may perform passive BQE in addition to, or instead of, active BQE. For example, the processor 204 may perform passive BQE when the processor 204 attempts active BQE and fails. As another example, the processor 204 may be configured to perform passive BQE without receiving the passive BQE command.

Figure 3:
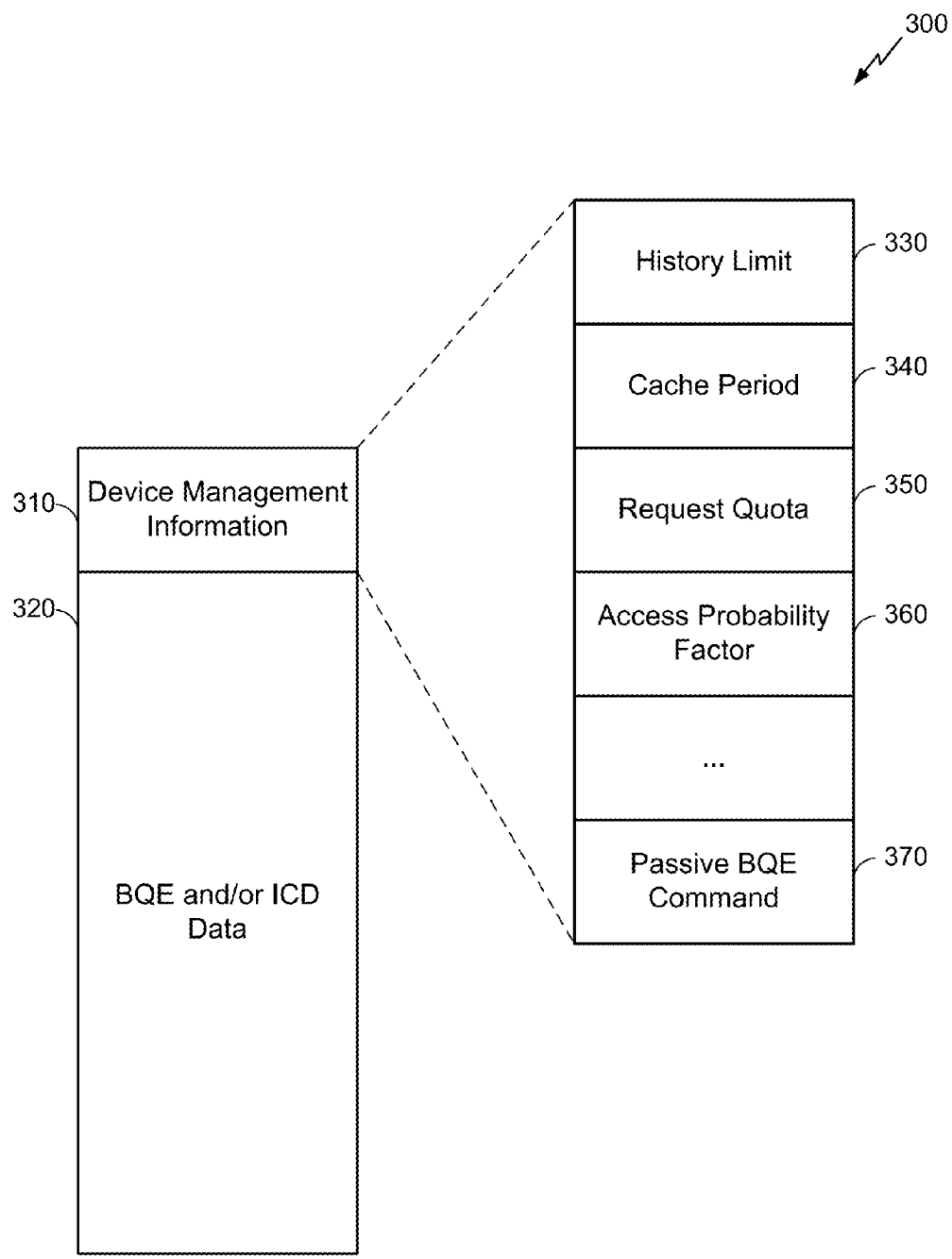
FIG. 3 is a schematic illustration of a query response, according to one embodiment.

FIG. 3 is a schematic illustration of a query response 300, according to one embodiment. The query response 300 can include one or more of a BQE response and an ICD response, described below with respect to FIG. 5. As shown, the query response 300 includes device management information 310 and BQE and/or ICD data 320. Although the device management information 310 and the BQE or ICD data 320 are shown in a particular arrangement, one having ordinary skill in the art will appreciate that other arrangements are possible. For example, the positions of the device management information 310 and the BQE data 320 can be reversed, interleaved, separated by additional data, etc. Furthermore, the BQE or ICD data 320 can be omitted in embodiments where the device management information 310 is sufficient for BQE or ICD.

Crowd Information

The BQE and/or ICD data 320 can include dummy data and/or useful data such as, for example, information about nearby WiFi hotspots, a challenge response, etc. In an embodiment, the quality estimation response may include crowd-sourced information ("crowd information"). The crowd information may include BQE information based on BQE results of one or more other STAs 106 for a specific AP 104. At least some of the crowd information can by provided by other users and collected on the server 116. In an embodiment, the crowd information includes a numerical value indicating whether the communication link 112 is of sufficient quality. In another embodiment, the crowd information includes an average BQE metric for the communication link 112. In another embodiment, the crowd information can include one or more other metrics based on past BQE results stored at the server 116. A person having ordinary skill in the art will appreciate that the crowd information can use any suitable encoding.

In an embodiment, the query response 300 can be formatted as text, hypertext markup language (HTML), extensible markup language (XML), or any other data format. In one embodiment, the query response 300 can be formatted as follows:

```
<access probability>0.7</access probability>
<quota>9</quota>
<bytes from here on until end are meaningless>
Pppppppppppppppppppppppppppppppppppppppppppppp....
```

In the illustrated embodiment, the device management information 320 includes a history limit 330, a cache period 340, a request quota 360, an access probability factor 360, and a passive BQE command 370. In various embodiments, the device management information 320 may include the history limit 330, the cache period 340, the request quota 360, the access probability factor 360, and the passive BQE command 370 in a different order, may include additional information, and/or may omit one or more of the history limit 330, the cache period 340, the request quota 360, the access probability factor 360, and the passive BQE command 370. In various embodiments, the processor 204 can act on one or more of the history limit 330, the cache period 340, the request quota 360, the access probability factor 360, and the passive BQE command 370, either alone or in combination.

History Limit

In an embodiment, the query response 300 may include the history limit 330. The history limit may include information indicating how many BQE and/or ICD results the processor 204 should store for each communication network. In an embodiment, the history limit 330 includes a numerical value indicating maximum number of BQE and/or ICD results that the processor 204 should store in the memory 206 for each communication network for which the processor 204 performs BQE and/or ICD. A person having ordinary skill in the art will appreciate that the history limit 330 can use any suitable encoding. In various embodiments, the device management information 310 can include a separate history limit 330 for one or both of BQE and ICD requests, or a combined history limit 330 for both BQE and ICD requests.

In one embodiment, the processor 204 may attempt BQE and/or ICD, for example, when the wireless device 202s connects to the AP 104. In order to determine whether the server 116 is available for BQE and/or ICD, the processor may read a BQE and/or ICD result history from the memory 206. The result history may include a long term history of BQE and/or ICD results. In an embodiment, the result history may include a list of network identifiers, corresponding BQE and/or ICD results, and/or corresponding time stamps indicating when each result was recorded. The network identifiers can include, for example, SSIDs, BSSIDs, router media access control (MAC) addresses, network domain names, etc.

The STA 106 may maintain separate result histories for BQE and ICD results, or may maintain a combined result history. In an embodiment, the result history (storing a relatively long term result history) and a result cache (storing a relatively short term result history, as described below) can be included in the same data set. In another embodiment, the result history and the result cache can be stored separately.

The processor 204 may determine a current network identifier (i.e. the network identifier for the network to which the wireless device 202s is connected). The processor 204 may compare the current network identifier to the network identifiers in the result history stored in the memory 206. If the current network identifier is not included in the result history stored in the memory 206, then the processor 204 may determine that the server 116 is available for BQE and/or ICD. If the current network identifier is included in the result history stored in the memory 206, then the processor 204 may determine that the server 116 is available for BQE if the local history does not allow BQE to conclude (for example, BQE pass or BQE fail). The local history allows to BQE to conclude when Average−Standard Deviation>Threshold, in which case it concludes BQE pass, or when Average+Standard Deviation<Threshold in which case it concludes BQE fail. In the foregoing equations, Average is the average of the past X BQE results for the current network identifier, Standard Deviation is the standard deviation over the past X results, and Threshold is a threshold bitrate.

In an embodiment, X is equal to the history limit 330. In an embodiment, the memory 206 may store a pre-set X value. In another embodiment, the processor 204 may generate the X value based on, for example, historical BQE and/or ICD results, a battery level, etc. In another embodiment, the processor 204 may retrieve the X value via the receiver 212 and store the X value in the memory 206. In an embodiment, the processor 204 may receive the X value from the server 116 in response to a quality estimation request. The X value may be included in the query response 300.

In an embodiment, the memory 206 may store a pre-set Threshold value. In another embodiment, the processor 204 may generate the Threshold value based on, for example, historical BQE results, a battery level, etc. In another embodiment, the processor 204 may retrieve the Threshold value via the receiver 212 and store the Threshold value in the memory 206. In an embodiment, the processor 204 may receive the Threshold value from the server 116 in response to a BQE or ICD request. The Threshold value may be included in the query response 300. In an embodiment, the processor may use radio parameters measured over the air to compute the current threshold value.

In one embodiment, the processor 204 may generate a random or pseudo-random number. In another embodiment, the DSP 204 may generate the random or pseudo-random number. The random or pseudo-random number may be generated within the range of 0 to 1. The processor 204 may compare the generated number to a threshold to determine whether the server 116 is available for BQE. In an embodiment, the processor 204 may determine that the server 116 is available for BQE when the generated number is less than the threshold. In an embodiment, the processor 204 may determine that the server 116 is available for BQE when the generated number is less than or equal to the threshold.

In another embodiment, the processor 204 may increment a counter every time the processor 204 attempts BQE. The processor 204 may store the counter in the memory 206. The processor 204 may compare the counter to a quota to determine whether the server 116 is available for BQE. In an embodiment, the processor 204 may determine that the server is available for BQE when the counter is less than the quota.

In general, a higher Threshold value will tend to cause the processor 204 to perform BQE more frequently. Similarly, a lower Threshold value will tend to cause the processor 204 to perform BQE less frequently. When the historical BQE results for a given communication network are relatively high, the processor 204 will tend to perform BQE less frequently. When the historical BQE results for a given communication network are relatively low, the processor 204 will tend to perform BQE more frequently. Accordingly, the processor 204 will tend to perform BQE more frequently when connected to a network of relatively low quality.

In another embodiment, the processor 204 may determine that the server 116 is available for BQE with a probability related to a variability of historical BQE results. For example, the processor 204 may determine that the server 116 is available for BQE with a probability of $1-(STDEV_x/Threshold)$, where $STDEV_x$ is the standard deviation of the past X BQE results for the current network identifier, and Threshold is a threshold bitrate. In another embodiment, the processor 204 may determine that the server 116 is available for BQE with a probability related to one or more of the following statistical metrics of historical BQE results: mean, median, average, standard deviation, variability, min, max, etc.

In an embodiment, the memory 206 may store a pre-set history limit 330. In another embodiment, the processor 204 may generate the history limit 330 based on, for example, historical BQE and/or ICD results, a battery level, etc. In another embodiment, the processor 204 may retrieve the history limit 330 via the receiver 212 and store the history limit 330 in the memory 206. In an embodiment, the processor 204 may receive the history limit 330 from the server 116 in response to a BQE and/or ICD request.

Cache Period

In an embodiment, the query response 300 may include a cache period 340. The cache period may include information indicating how long the processor 204 should wait between successive BQE and/or ICD requests for the same network connection. In one embodiment, for example, the processor 204 may attempt BQE and/or ICD once an hour. If the cache period 340 indicates a three hour cache period, then the processor 204 will determine that the server 116 is available for the first BQE and/or ICD attempt, and then determine that the server 116 is not available for the subsequent two BQE and/or ICD attempts within the three hour period, and the BQE and/or ICD attempt will fail.

In an embodiment, the cache period 340 includes a numerical value indicating a time period during which the processor 204 should not perform BQE and/or ICD more than once. The cache period 340 may include any time frame (for example, an hour, three hours, a day, a week, a month, etc.). A person having ordinary skill in the art will appreciate that the cache period 340 can use any suitable encoding. In various embodiments, the device management information 310 can include a separate cache period 340 for one or both of BQE and ICD requests, or a combined cache period 340 for both BQE and ICD requests.

In one embodiment, the processor 204 may attempt BQE and/or ICD, for example, when the wireless device 202s connects to the AP 104. In order to determine whether the server 116 is available for BQE and/or ICD, the processor may read a result cache from the memory 206. The result cache may include a short term history of BQE and/or ICD results. In an embodiment, the result cache may include a list of network identifiers, corresponding BQE and/or ICD results, and/or corresponding time stamps indicating when each BQE and/or ICD result was recorded. The network identifiers can include, for example, Service Set Identifiers (SSIDs), Basic Service Set Identifiers (BSSIDs), router media access control (MAC) addresses, network domain names, Cell Identifier, etc.

The STA 106 may maintain separate result caches for BQE and ICD results, or may maintain a combined result cache. In an embodiment, the result history (storing a relatively long term result history, as described above) and the result cache (storing a relatively short term result history) can be included in the same data set. In another embodiment, the result history and the result cache can be stored separately.

The processor 204 may determine a current network identifier (i.e. the network identifier for the network to which the wireless device 202s is connected). The processor 204 may compare the current network identifier to the network identifiers in the result cache stored in the memory 206. If the current network identifier is not included in the result cache stored in the memory 206, then the processor 204 may determine that the server 116 is available for BQE and/or ICD. If the current network identifier is included in the result cache stored in the memory 206, then the processor 204 may determine that the server 116 is not available for BQE and/or ICD. In an embodiment, the processor 204 may determine that the server 116 is not available for BQE and/or ICD if the current network identifier is included in the result cache, and the time stamp is older than the cache period 340. If the processor 204 determines that the server 116 is available for BQE and/or ICD, the processor 204 can perform the BQE and/or ICD as described herein. The processor 204 may store the BQE and/or ICD result in the BQE result cache, along with the current network identifier and/or a time stamp.

In an embodiment, the memory 206 may store a pre-set cache period 340. In another embodiment, the processor 204 may generate the cache period 340 based on, for example, historical BQE and/or ICD results, a battery level, etc. In another embodiment, the processor 204 may retrieve the cache period 340 via the receiver 212 and store the cache period 340 in the memory 206. In an embodiment, the processor 204 may receive the cache period 340 from the server 116 in response to a BQE and/or ICD request.

Request Quota

In an embodiment, query response 300 may include the request quota 350. The request quota 350 may include information indicating whether a BQE and/or ICD attempt should succeed when the processor 204 determines availability of the server 116 for BQE and/or ICD. Specifically, the request quota 350 may indicate a limit on the number of BQE and/or ICD attempts that should succeed in a period of time. In one embodiment, for example, the processor 204 may attempt BQE and/or ICD ten times within a day. If the request quota 350 indicates a five BQE and/or ICD limit per day, then the processor 204 will determine that the server 116 is available for the first five BQE and/or ICD attempts, and then determine that the server 116 is not available for the subsequent five BQE attempts, and the BQE and/or ICD attempt will fail.

In an embodiment, the request quota 350 includes a numerical value indicating a limit on the number of BQE and/or ICD attempts that should succeed within a given period. The request quota 350 may explicitly identify the period, or the period may be implicit. A quota period may include any time frame (for example, an hour, a day, a week, a month, etc.), a dynamic period (for example, per AP, per reboot, per wireless session), or any combination thereof. A person having ordinary skill in the art will appreciate that the request quota 350 can use any suitable encoding. In various embodiments, the device management information 310 can include a separate request quota 350 for one or both of BQE and ICD requests, or a combined request quota 350 for both BQE and ICD requests.

In one embodiment, the processor 204 may increment a counter every time the processor 204 determines the server available for BQE and/or ICD. The processor 204 may store the counter in the memory 206. The processor 204 may compare the counter to the request quota 350 to determine whether the server 116 is available for BQE and/or ICD. In an embodiment, the processor 204 may determine that the server is available for BQE and/or ICD when the counter is less than the request quota 350. In another embodiment, the processor 204 may determine that the server is available for BQE and/or ICD then the counter is less than or equal to the request quota 350. In various embodiments, the processor 204 may determine that the server 116 is not available for BQE and/or ICD in each of the aforementioned conditions.

The processor 204 may reset the counter according to the device management information. For example, the processor 204 may reset the counter every hour, day week, month, each time the wireless device 202s connects to a different AP, each time the wireless device 202s restarts, etc. In an embodiment, the processor 204 may determine whether the server 116 is available for BQE and/or ICD based on a combination of the request quota 350 and the access probability factor. For example, if the processor 204 determines that the request quota 350 has not been exceeded, then the processor may determine that the server 116 is available for BQE and/or ICD regardless of the access probability factor. If, on the other hand, the processor 204 determines that the request quota 350 has been exceeded, then the processor may determine whether the server 116 is available for BQE and/or ICD based on the access probability factor, as described above.

In an embodiment, the memory 206 may store a pre-set request quota 350. In another embodiment, the processor 204 may generate the request quota 350 based on, for example, historical BQE and/or ICD results, a battery level, etc. In another embodiment, the processor 204 may retrieve the request quota 350 via the receiver 212 and store the request quota 350 in the memory 206. In an embodiment, the processor 204 may receive the request quota 350 from the server 116 in response to a BQE and/or ICD request.

Access Probability Factor

In an embodiment, the query response 300 may include an access probability factor 360. The access probability factor 360 may include information indicating how often a BQE and/or ICD attempt should succeed when the processor 204 determines availability of the server 116 for BQE and/or ICD. Specifically, the access probability factor 360 may indicate a probability with which a BQE and/or ICD attempt should succeed. In one embodiment, for example, the processor 204 may attempt BQE and/or ICD every time the wireless device 202s associates with an AP 104 via the transmitter 214. If the access probability factor 360 indicates a 50% success rate, then the processor 204 will determine that the server 116 is not available roughly 50% of the time, and the BQE and/or ICD attempt will fail.

In an embodiment, the access probability factor 360 includes a numerical value from 0 to 1, with 0 indicating a 0% probability of BQE and/or ICD success and 1 indicating a 100% probability of BQE and/or ICD success. In another embodiment, the access probability factor 360 includes a numerical value from 0 to 100, with 0 indicating a 0% probability of BQE and/or ICD success and 100 indicating a 100% probability of BQE and/or ICD success. In another embodiment, the access probability factor 360 includes a numerical value X, indicating that every X BQE and/or ICD attempt should succeed. A person having ordinary skill in the art will appreciate that the access probability factor 360 can use any suitable encoding. In various embodiments, the device management information 310 can include a separate access probability factor 360 for one or both of BQE and ICD requests, or a combined access probability factor 360 for both BQE and ICD requests.

In one embodiment, the processor 204 may generate a random or pseudo-random number. In another embodiment, the DSP 204 may generate the random or pseudo-random number. The random or pseudo-random number may be generated within the range of possible values for the access probability factor 360. The processor 204 may compare the generated number to the access probability factor 360 to determine whether the server 116 is available for BQE and/or ICD. In an embodiment, the processor 204 may determine that the server 116 is available for BQE and/or ICD when the generated number is less than the access probability factor 360. In an embodiment, the processor 204 may determine that the server 116 is available for BQE and/or ICD when the generated number is less than or equal to the access probability factor 360. In an embodiment, the processor 204 may determine that the server 116 is available for BQE and/or ICD when the generated number is greater than the access probability factor 360. In an embodiment, the processor 204 may determine that the server 116 is available for BQE and/or ICD when the generated number is greater than or equal to the access probability factor 360. In various embodiments, the processor 204 may determine that the server 116 is not available for BQE and/or ICD in each of the aforementioned conditions.

In another embodiment, the processor 204 may increment a counter every time the processor 204 attempts BQE and/or ICD. The processor 204 may store the counter in the memory 206. The processor 204 may compare the counter to the access probability factor 360 to determine whether the server 116 is available for BQE and/or ICD. In an embodiment, the processor 204 may determine that the server is available for BQE and/or ICD when the counter is an even multiple of the access probability factor 360. In another embodiment, the processor 204 may determine that the server is available for BQE and/or ICD then the counter is an even multiple of the inverse of the access probability factor 360. In various embodiments, the processor 204 may determine that the server 116 is not available for BQE and/or ICD in each of the aforementioned conditions.

In an embodiment, the memory 206 may store a pre-set access probability factor 360. In another embodiment, the processor 204 may generate the access probability factor 360 based on, for example, historical BQE and/or ICD results, a battery level, etc. In another embodiment, the processor 204 may retrieve the access probability factor 360 via the receiver 212 and store the access probability factor 360 in the memory 206. In an embodiment, the processor 204 may receive the access probability factor 360 from the server 116 in response to a BQE and/or ICD request.

Figure 4:
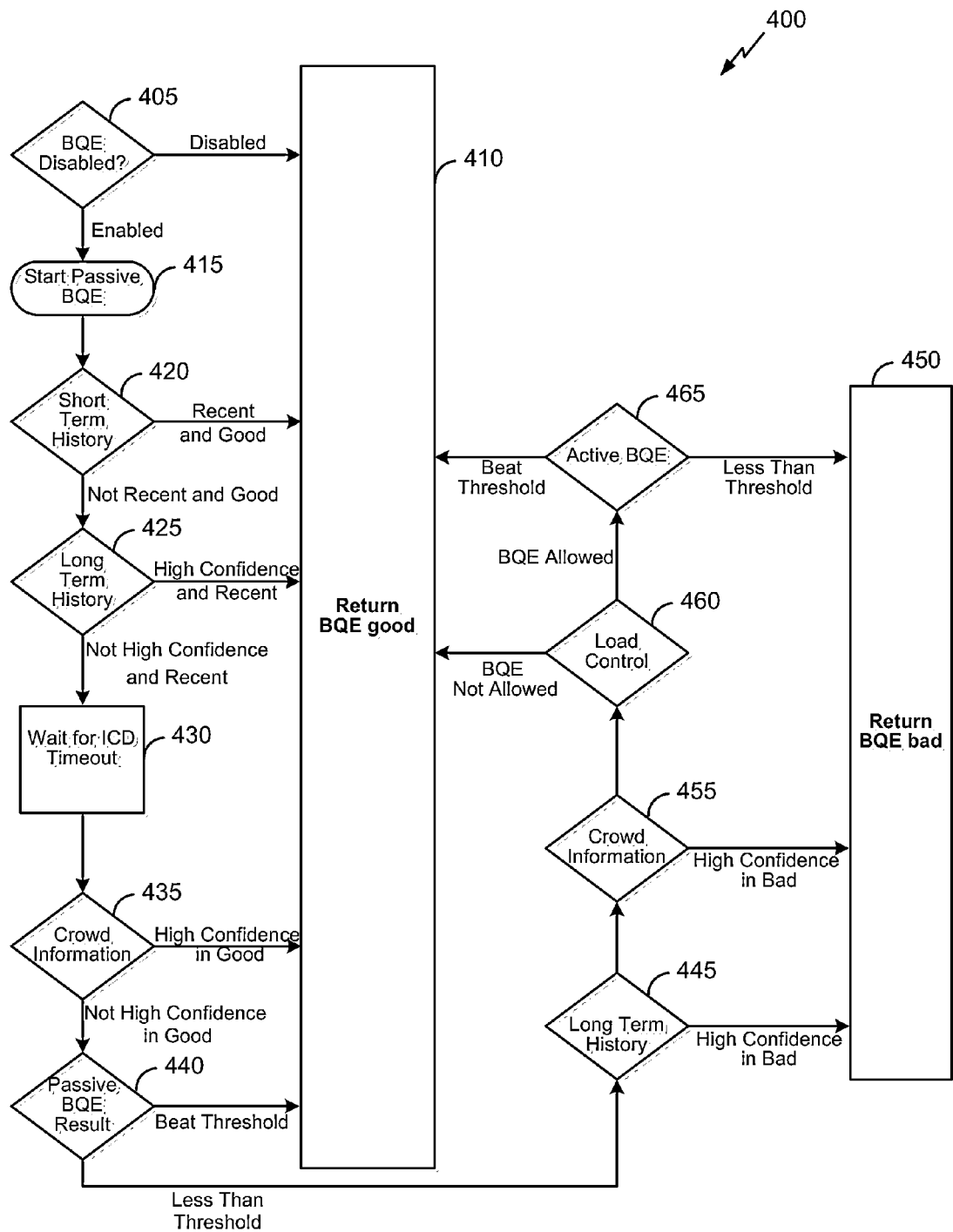
FIG. 4 is a flowchart illustrating a method of determining the sufficiency of a communication link quality.

FIG. 4 is a flowchart 400 illustrating a method of determining the sufficiency of a communication link quality. For clarity, the flowchart 400 is described below with reference to the communication network 100 shown in FIG. 1 and device 202s shown in FIG. 2. However, a person having ordinary skill in the art will appreciate that the method of flowchart 400 can be used with any suitable device. In one implementation, the processor 204 executes one or more sets of codes to control the functional elements of the device 202s to perform the functions described below. In various embodiments, steps described herein may be performed in a different order or omitted, and additional steps may be added.

In an embodiment, the STA 106 may follow the flowchart 400 when connecting to a new AP 104. The STA 106 may determine whether the communication link 112 is of sufficient quality based on the result of the flowchart 400. If the flowchart 400 indicates that the communication link 112 is of insufficient quality, the STA 106 may not use the AP 104 for communication, and may use another radio and/or AP instead. For example, the STA 106 may switch from a WiFi radio to a cellular radio when BQE for a WiFi AP indicates low quality. If the flowchart 400 indicates that the communication link 112 is of sufficient quality, on the other hand, the STA 106 may use the AP 104 for communication.

First, at block 405, the processor 204 determines whether BQE is enabled. The processor 204 may determine whether BQE is enabled by checking a value stored in the memory 206. In an embodiment, the STA 106 may receive information about whether BQE should be enabled from the server 116. In another embodiment, the STA 106 may receive information about whether BQE should be enabled from a service provider. If the processor 204 determines that BQE is disabled, the processor 204 may determine that the communication link 112 is of sufficient quality at block 410. If, on the other hand, the processor 204 determines that BQE is enabled, the processor 204 may continue to block 415.

Next, at block 415, the processor 204 may start passive BQE, as described above. The processor 204 may run passive BQE in the background, monitoring incidental communication between the STA 106 and one or more Internet hosts. While passive BQE is running, the processor 204 may continue to block 420.

Then, at block 420, the processor 204 may check the short term history for the AP 104, as described above. For example, the processor may read a BQE result cache from the memory 206. In an embodiment, the processor 204 may determine that the short term history is both recent and good if the current network identifier is included in the BQE result cache, and the time stamp is older than the BQE cache period. If the short term history is both recent and good, the processor 204 may determine that the communication link 112 is of sufficient quality at block 410. If, on the other hand, the processor 204 determines that the short term history is not recent and good, the processor 204 may continue to block 425.

Thereafter, at block 425, the processor 204 may check the long term history for the AP 104, as described above. For example, the processor may read a BQE result history from the memory 206. In an embodiment, the processor 204 may determine whether the long term history is high confidence and good when Average−Standard Deviation>Threshold, where Average is the average of the past X BQE results for the current network identifier, Standard Deviation is the standard deviation over the past X results, and Threshold is a threshold bitrate. If the long term history is both high confidence and recent, the processor 204 may determine that the communication link 112 is of sufficient quality at block 410. If, on the other hand, the processor 204 determines that the long term history is not high confidence and recent, the processor 204 may continue to block 430.

Subsequently, at block 430, the processor 204 may wait for either an ICD response or an ICD timeout. As will be described below with respect to FIG. 5, the STA 106 may receive crowd information from the server 116 in conjunction with an ICD response. If the STA 106 does not receive an ICD response within a timeout period after sending an ICD request to the server 116, the ICD may timeout. After the ICD succeeds or times out, the processor 204 proceeds to block 435.

Next, at block 435, the processor 204 reads the crowd information received from the server 116. If the crowd information indicates that the communication link 112 is of sufficient quality, the processor 204 may proceed to block 410. If the crowd information does not indicate that the communication link 112 is of sufficient quality, or the STA 106 does not successfully receive the crowd information from the server 116, the processor 204 continues to block 440.

Then, at block 440, the processor 204 checks the result of the passive BQE started at block 415. The processor 204 compares the passive BQE result to a threshold quality value indicative of a sufficient quality for the communication link 112. If the processor 204 determines that the passive BQE result is equal to or greater than the BQE threshold, the processor continues to block 410. If, on the other hand, the processor 204 determines that the passive BQE result is less than the BQE threshold, or passive BQE fails, the processor continues to block 445.

Thereafter, at block 445, the processor 204 may again check the long term history for the AP 104, as described above. For example, the processor may read a BQE result history from the memory 206. In an embodiment, the processor 204 may determine whether the long term history is high confidence and bad when Average+Standard Deviation<Threshold, where Average is the average of the past X BQE results for the current network identifier, Standard Deviation is the standard deviation over the past X results, and Threshold is a threshold bitrate. If the long term history is both high confidence and bad, the processor 204 may determine that the communication link 112 is of insufficient quality at block 450. If, on the other hand, the processor 204 determines that the long term history is not high confidence and bad, the processor 204 may continue to block 455.

Subsequently, at block 455, the processor 204 again reads the crowd information received from the server 116. If the crowd information indicates that the communication link 112 is of insufficient quality, the processor 204 may proceed to block 450. If the crowd information does not indicate that the communication link 112 is of insufficient quality, or the STA 106 does not successfully receive the crowd information from the server 116, the processor 204 continues to block 460.

Next, at block 460, the processor 204 determines whether the server 116 is available for BQE, as described above with respect to load management techniques such as, for example, the access probability factor, the quality estimation quota, etc. If the processor 204 determines that the server 116 is not available for BQE, the processor 204 may determine that the quality of the communication link 112 is insufficient at block 410. If, on the other hand, the processor 204 determines that the server 116 is available for BQE, the processor 204 may continue to active BQE at block 465.

Then, at block 465, the processor 204 performs active BQE, as described above. In an embodiment, the processor 204 compares the active BQE result to a threshold quality value indicative of a sufficient quality for the communication link 112. If the processor 204 determines that the active BQE result is equal to or greater than the BQE threshold, the processor continues to block 410. If, on the other hand, the processor 204 determines that the active BQE result is less than the BQE threshold, or active BQE fails, the processor continues to block 450.

Internet Connection Detection (ICD)

In an embodiment, the STA 106 may detect and Internet connectivity of the communication link 112 when the STA 106 connects to the AP 104. In order to determine whether the AP 104 provides access to the Internet, the STA 106 may perform Internet Connection Detection (ICD). In an embodiment, the STA 106 may perform ICD every time the STA 106 connects to an AP 104. ICD may allow the STA 106 to detect whether the AP is a so-called "captive portal" which may respond incorrectly to Internet requests, for example by serving a payment request web page instead of the page requested. The STA 106 may detect whether the AP provides limited Internet connectivity.

Figure 5:
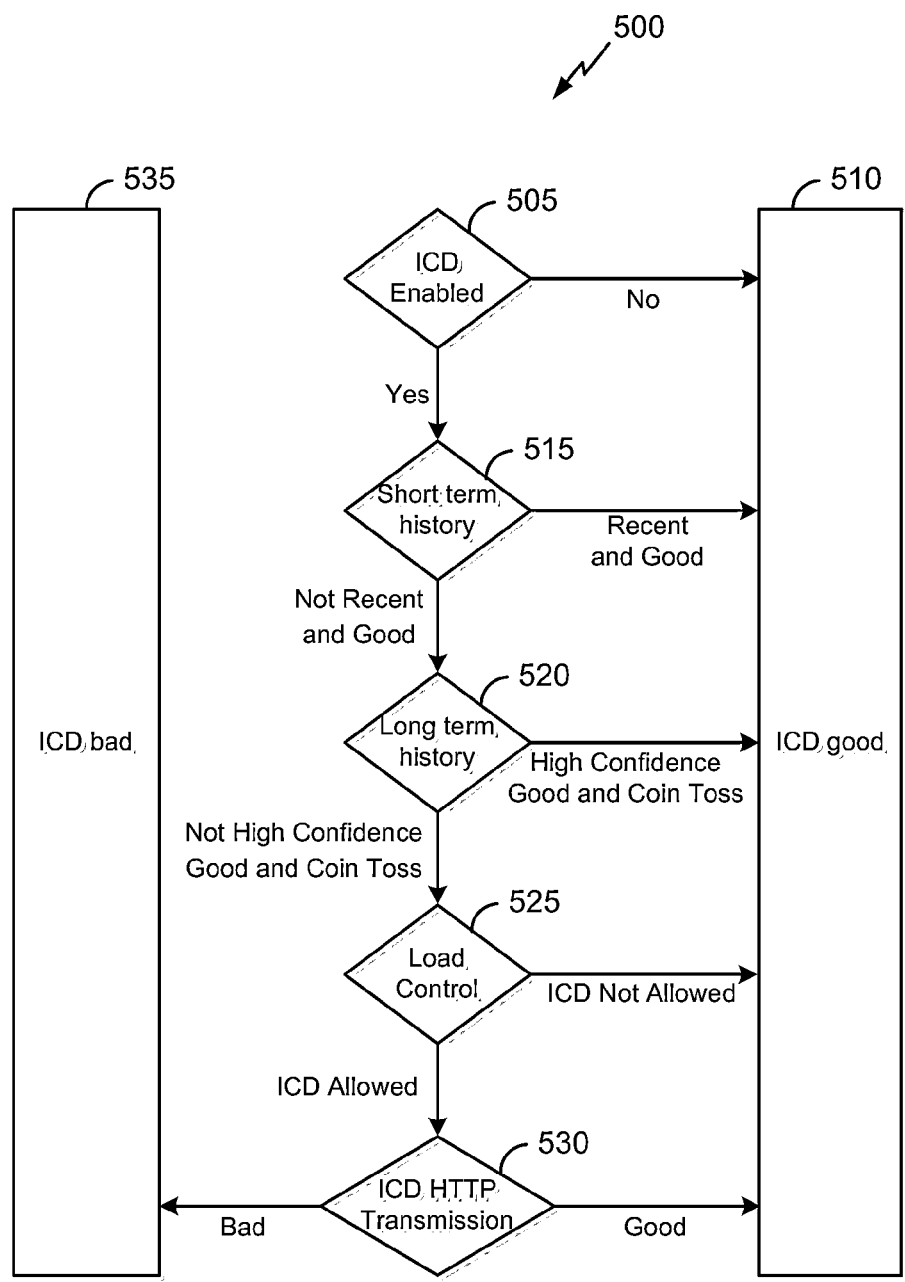
FIG. 5 is a flowchart illustrating a method of determining Internet connectivity of an access point.

FIG. 5 is a flowchart 500 illustrating a method of determining Internet connectivity of an access point 104. For clarity, the flowchart 500 is described below with reference to the communication network 100 shown in FIG. 1 and device 202s shown in FIG. 2. However, a person having ordinary skill in the art will appreciate that the method of flowchart 500 can be used with any suitable device. In one implementation, the processor 204 executes one or more sets of codes to control the functional elements of the device 202s to perform the functions described below. In various embodiments, steps described herein may be performed in a different order or omitted, and additional steps may be added.

First, at block 505, the processor 204 determines whether ICD is enabled. The processor 204 may determine whether ICD is enabled by checking a value stored in the memory 206. In an embodiment, the STA 106 may receive information about whether ICD should be enabled from the server 116. In another embodiment, the STA 106 may receive information about whether ICD should be enabled from a service provider. If the processor 204 determines that ICD is disabled, the processor 204 may determine that the AP 104 provides Internet connectivity at block 510. If, on the other hand, the processor 204 determines that ICD is enabled, the processor 204 may continue to block 515.

Next, at block 515, the processor 204 may check the short term history for the AP 104. In an embodiment, the short term history for ICD can include one or more aspects of the short term history for BQE, described above. In order to determine whether the AP 104 provides Internet connectivity, the processor may read an ICD result cache from the memory 206. The ICD result cache may include a short term history of ICD results. In an embodiment, the ICD result cache may include a list of network identifiers, corresponding ICD results, and/or corresponding time stamps indicating when each ICD result was recorded. The network identifiers can include, for example, Service Set Identifiers (SSIDs), Basic Service Set Identifiers (BSSIDs), router media access control (MAC) addresses, network domain names, etc.

The processor 204 may determine a current network identifier (i.e. the network identifier for the network to which the wireless device 202s is connected). The processor 204 may compare the current network identifier to the network identifiers in the ICD result cache stored in the memory 206. If the current network identifier is not included in the ICD result cache stored in the memory 206, then the processor 204 may not determine that the AP 104 provides Internet connectivity. If the current network identifier is included in the ICD result cache stored in the memory 206, then the processor 204 may determine that the AP 104 provides Internet connectivity based on the stored ICD result. In an embodiment, the processor 204 may determine that the AP 104 provides Internet connectivity if the current network identifier is included in the ICD result cache, and the time stamp is not older than the ICD cache period. If the processor 204 determines that the server 116 is available for ICD, the processor 204 can perform the ICD as described herein. The processor 204 may store the ICD result in the ICD result cache, along with the current network identifier and/or a time stamp.

In an embodiment, the memory 206 may store a pre-set ICD cache period. In another embodiment, the processor 204 may generate the ICD cache period based on, for example, historical ICD results, a battery level, etc. In another embodiment, the processor 204 may retrieve the ICD cache period via the receiver 212 and store the ICD cache period in the memory 206. In an embodiment, the processor 204 may receive the ICD cache period from the server 116 in response to a quality estimation request or ICD request. The ICD cache period may be included in the quality estimation response or ICD response.

If the processor 204 determines that the AP 104 provides Internet connectivity based on the short term history, the processor 204 may continue to block 510. If, on the other hand, the processor 204 does not determine that the AP 104 provides Internet connectivity, the processor 204 continues to block 520. For example, the processor 204 may continue to block 520 if the processor 204 determines that a recent ICD result indicates that the AP 204 does not provide Internet connectivity. In an embodiment, the processor 204 may continue to block 520 with a preset probability, regardless of the short term history result.

Then, at block 520, the processor may read an ICD result history from the memory 206. The ICD result history may include a long term history of ICD results. In an embodiment, the ICD result history may include a list of network identifiers, corresponding ICD results, and/or corresponding time stamps indicating when each ICD result was recorded. The network identifiers can include, for example, SSIDs, BSSIDs, router media access control (MAC) addresses, network domain names, etc. In an embodiment, the ICD result history (storing a relatively long term result history) and the ICD result cache (storing a relatively short term result history) can be included in the same data set. In another embodiment, the ICD result history and the ICD result cache can be stored separately.

The processor 204 may determine a current network identifier (i.e. the network identifier for the network to which the wireless device 202s is connected). The processor 204 may compare the current network identifier to the network identifiers in the ICD result history stored in the memory 206. If the current network identifier is not included in the ICD result history stored in the memory 206, then the processor 204 may not determine that the AP 104 provides Internet connectivity.

If the current network identifier is included in the ICD result history stored in the memory 206, then the processor 204 may determine that the AP 104 provides Internet connectivity if the most recent ICD result indicates that the AP 104 provides Internet connectivity. In an embodiment, the processor 204 may determine that the AP 104 provides Internet connectivity if all stored ICD results for the AP 104 indicate that the AP 104 provides Internet connectivity. In an embodiment, the processor 204 may determine that the AP 104 provides Internet connectivity with a probability related to an average of historical ICD results.

In one embodiment, the processor 204 may generate a random or pseudo-random number. In another embodiment, the DSP 204 may generate the random or pseudo-random number. The random or pseudo-random number may be generated within the range of 0 to 1. The processor 204 may compare the generated number to the probability to determine whether the AP 104 provides Internet connectivity. In an embodiment, the processor 204 may determine that the AP 104 provides Internet connectivity when the generated number is less than the probability. In an embodiment, the processor 204 may determine that the AP 104 provides Internet connectivity when the generated number is less than or equal to the probability.

In another embodiment, the processor 204 may increment a counter every time the processor 204 attempts ICD. The processor 204 may store the counter in the memory 206. The processor 204 may compare the counter to the probability to determine whether the AP 104 provides Internet connectivity. In an embodiment, the processor 204 may determine that the AP 104 provides Internet connectivity when the counter is an even multiple of the probability. In another embodiment, the processor 204 may determine that the AP 104 provides Internet connectivity then the counter is an even multiple of the inverse of the probability.

In general, a higher Threshold value will tend to cause the processor 204 to perform ICD more frequently. Similarly, a lower Threshold value will tend to cause the processor 204 to perform ICD less frequently. When the historical ICD results for a given communication network are relatively high, the processor 204 will tend to perform ICD less frequently. When the historical ICD results for a given communication network are relatively low, the processor 204 will tend to perform ICD more frequently. Accordingly, the processor 204 will tend to perform ICD more frequently when connected to a network of relatively low quality.

In an embodiment, the memory 206 may store a pre-set ICD history limit. In another embodiment, the processor 204 may generate the ICD history limit based on, for example, historical ICD results, a battery level, etc. In another embodiment, the processor 204 may retrieve the ICD history limit via the receiver 212 and store the ICD history limit in the memory 206. In an embodiment, the processor 204 may receive the ICD history limit from the server 116 in response to a quality estimation request or an ICD request. The ICD history limit may be included in the quality estimation response or an ICD response.

If the processor 204 determines that the AP 104 provides Internet connectivity based on the long term history, the processor 204 may continue to block 510. If, on the other hand, the processor 204 does not determine that the AP 104 provides Internet connectivity, the processor 204 continues to block 525. In an embodiment, the processor 204 may continue to block 520 with a preset probability, regardless of the long term history result. In an embodiment, the processor 204 may continue to block 510 with a preset probability, regardless of the long term history result.

Thereafter, at block 525, the processor 204 determines whether the server 116 is available for ICD, as described above with respect to load management techniques such as, for example, the access probability factor, the quality estimation quota, etc. Although various load management techniques are described above with respect to BQE, one or more aspects of the BQE load management techniques may be applied to ICD load management. For example, the STA 106 may receive an ICD quota from the server 116 via a BQE or ICD response. As another example, the STA 106 may receive an access probability factor for ICD from the server 116 via a BQE or ICD response. If the processor 204 determines that the server 116 is not available for ICD, the processor 204 may determine that the AP 104 does provide Internet connectivity at block 510. If, on the other hand, the processor 204 determines that the server 116 is available for ICD, the processor 204 may continue to ICD at block 530.

Subsequently, at block 530, the processor 204 initiates ICD. In an embodiment, the processor 204 may generate an ICD request. The processor 204 may transmit the ICD request to the server 116, for example, via HTTP. In an embodiment, the processor 204 binds the ICD HTTP transmission to a WLAN interface. The processor 204 may keep track of the number of ICD requests made and store the number in the memory 206.

In an embodiment, the processor 204 may generate an ICD URI to which the ICD request will be sent. The ICD URI may include indentifying information of the STA 106, the AP 104, and/or a temporary identifier. The temporary identifier may include a key such as, for example, the BSSID of the AP 104. The temporary identifier can include random or pseudorandom data. The temporary identifier may be based on an identifier of the STA 106, the AP 104, the communication system 100, and/or the server 116. In an embodiment, the temporary identifier may be referred to as a "token." The ICD request may include an ICD HTTP GET for the ICD URI to the server 116.

The processor 204 may wait an amount of time for a response from the server 116. The amount of time may be an ICD timeout value. If the ICD response is received before the ICD timeout, the processor 204 may time stamp the response. If the ICD response includes the key in an expected position, the processor 204 may determine that the AP 104 provides Internet connectivity at block 510.

If the ICD response is not received within the ICD timeout, the processor may determine that the AP 104 does not provide Internet connectivity at block 535. If the ICD response does not include the key the processor may determine that the AP provides limited connectivity. In an embodiment, the processor 204 may generate and send a DNS request in order to determine the IP address of the server 116. If the DNS request fails, the processor 204 may determine that the AP 104 does not provide Internet access at block 510. Regardless of whether ICD succeeds or fails, the processor 204 may store the ICD result in the memory 206.

Figure 6:
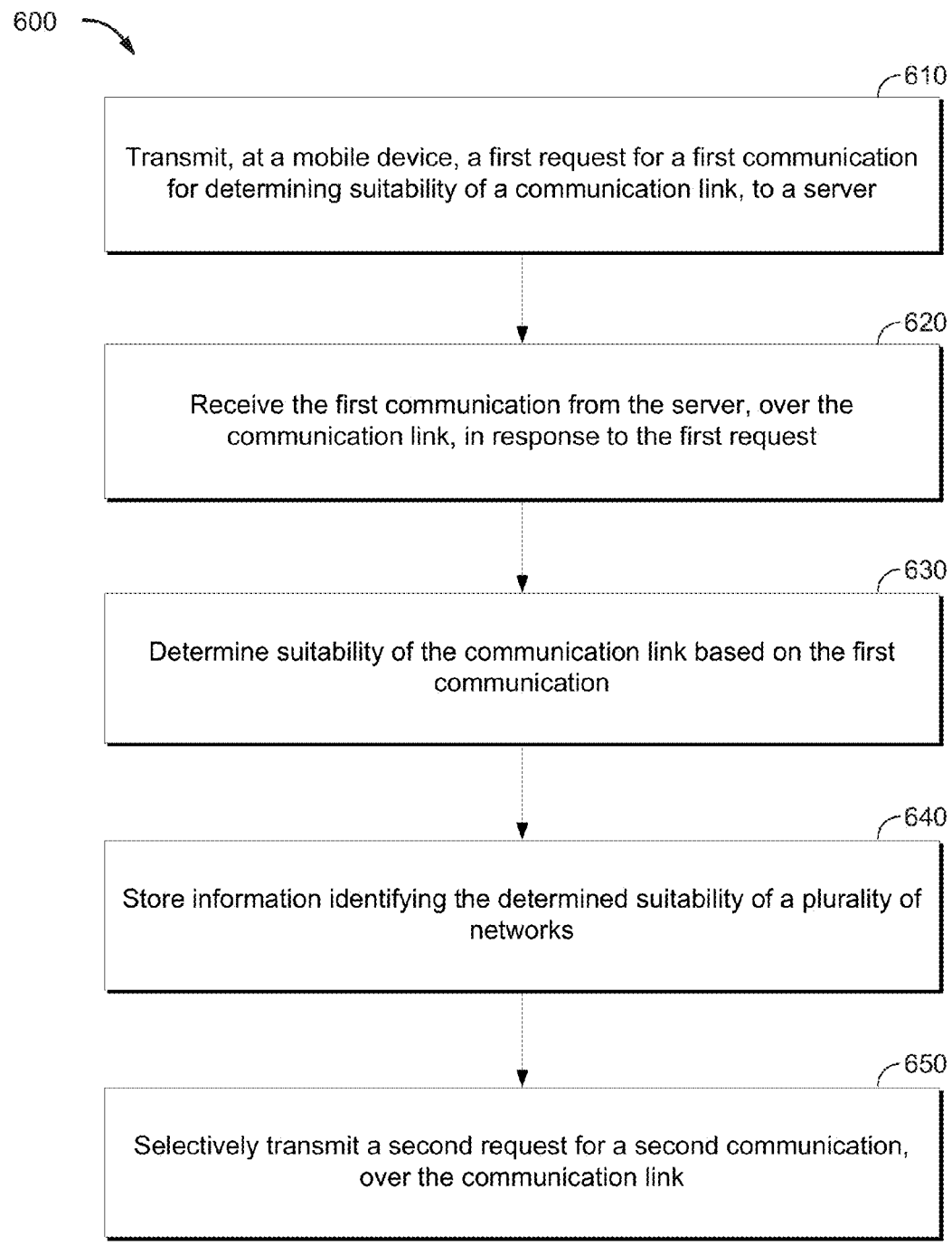
FIG. 6 is a flowchart illustrating an embodiment of a method of determining a characteristic of a communication link.

FIG. 6 is a flowchart 600 illustrating an embodiment of a method of determining a characteristic of a communication link. Although the method of flowchart 600 is described herein with reference to the wireless communication system 100 discussed above with respect to FIG. 2, and to the wireless device 202 discussed above with respect to FIG. 2, a person having ordinary skill in the art will appreciate that the method of flowchart 600 may be implemented by another device described herein, or any other suitable device. In an embodiment, the steps in flowchart 600 may be performed, at least in part, by a processor or controller such as, for example, the processor 204 (FIG. 2) and/or the DSP 220 (FIG. 2), potentially in conjunction with the memory 206 (FIG. 2). Although the method of flowchart 600 is described herein with reference to a particular order, in various embodiments, blocks herein may be performed in a different order, or omitted, and additional blocks may be added.

First, at block 610, the STA 106 transmits a first request for a first communication to the server 116, over the communication link 112. The first communication can be for determining suitability of the communication link 112. In various embodiments, the first request can include one or more of a BQE request and an ICD request, as discussed above with respect to FIGS. 2-4. The first communication can include one or more of a BQE response and an ICD response, as discussed above with respect to FIGS. 2-4.

Next, at block 620, the STA 106 receives the first communication from the server 116, in response to the first request. The server 116 can send the first communication over the communication link 112. The STA 106 can receive the first communication via the receiver 212.

Then, at block 630, the STA 106 determines suitability of the communication link 112 based on the first communication. For example, in embodiments where the first communication includes a BQE response, the STA 106 can determine suitability of the communication link 112 in accordance with one or more aspects of the flowchart 400, as discussed above with respect to FIG. 4. In embodiments where the first communication includes an ICD response, the STA 106 can determine suitability of the communication link 112 in accordance with one or more aspects of the flowchart 500, as discussed above with respect to FIG. 5.

Thereafter, at block 640, the STA 106 stores information identifying the determined suitability of a plurality of networks. For example, the STA 106 can store the information identifying the determined suitability of the communication link 112, in conjunction with the network associated with the AP 104. In an embodiment, the STA 106 can store the information identifying the determined suitability in accordance with the short-term and/or long-term BQE history, described above with respect to FIG. 2. In another embodiment, the STA 106 can store the information identifying the determined suitability in accordance with the short-term and/or long-term ICD history, described above with respect to FIG. 5.

Subsequently, at block 650, the STA selectively transmits a second request for a second communication to the server 116, over the communication link 112. The second communication can be for determining suitability of the communication link 112. In various embodiments, the second request can include one or more of a BQE request and an ICD request, as discussed above with respect to FIGS. 2-4. The second communication can include one or more of a BQE response and an ICD response, as discussed above with respect to FIGS. 2-4.

The STA 106 can determine whether or not to transmit the second request based on one or more of a short-term history, a long-term history, crowd information, a passive BQE result, and load management techniques such as, for example, the access probability factor, the quality estimation quota, etc. For example, in embodiments where the second communication includes a BQE response, the STA 106 can determine suitability of the communication link 112 in accordance with one or more aspects of the flowchart 400, as discussed above with respect to FIG. 4. In embodiments where the second communication includes an ICD response, the STA 106 can determine suitability of the communication link 112 in accordance with one or more aspects of the flowchart 500, as discussed above with respect to FIG. 5.

Figure 7:
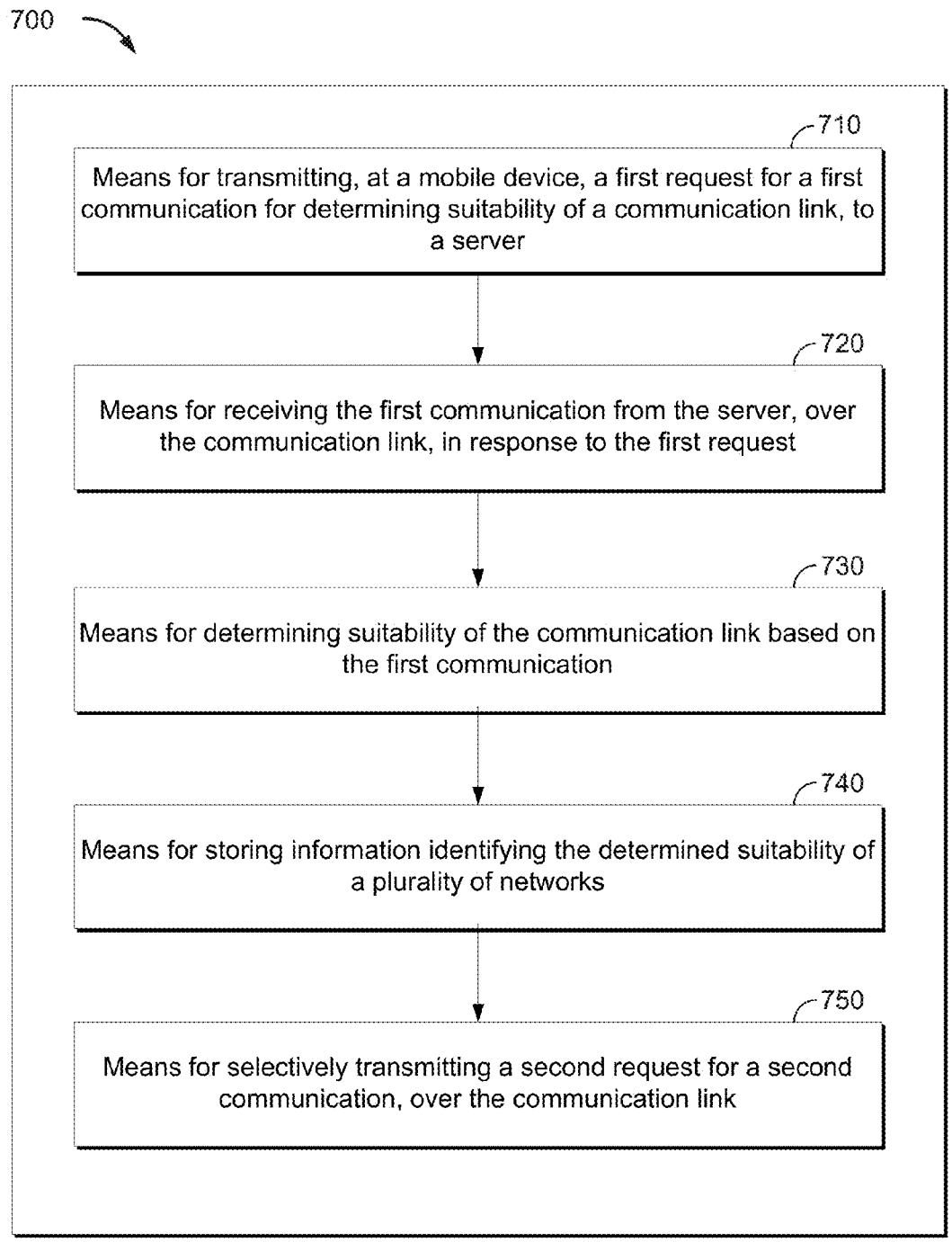
FIG. 7 is a functional block diagram of a system for determining a characteristic of a communication link, in accordance with an exemplary embodiment of the invention.

FIG. 7 is a functional block diagram of a system 700 for determining a characteristic of a communication link, in accordance with an exemplary embodiment of the invention. Those skilled in the art will appreciate that a system may have more components than the simplified system 700 shown in FIG. 7. The system 700 shown includes only those components useful for describing some prominent features of implementations within the scope of the claims.

The system 700 for determining a characteristic of a communication link includes means 710 for transmitting, at a mobile device, a first request for a first communication for determining suitability of a communication link, to a server, means 720 for receiving the first communication from the server, over the communication link, in response to the first request, means 730 for determining suitability of the communication link based on the first communication, means 740 for storing information identifying the determined suitability of a plurality of networks, and means 750 for selectively transmitting a second request for a second communication, over the communication link.

In an embodiment, the means 710 for transmitting, at a mobile device, a first request for a first communication for determining suitability of a communication link, to a server can be configured to perform one or more of the functions described above with respect to block 610 (FIG. 6). In various embodiments, the means 710 for transmitting, at a mobile device, a first request for a first communication for determining suitability of a communication link, to a server can be implemented by one or more of the processor 204 (FIG. 2), the memory 206 (FIG. 2), the DSP 220 (FIG. 2), and the transmitter 210 (FIG. 2).

In an embodiment, the means 720 for receiving the first communication from the server, over the communication link, in response to the first request can be configured to perform one or more of the functions described above with respect to block 620 (FIG. 6). In various embodiments, the means 720 for receiving the first communication from the server, over the communication link, in response to the first request can be implemented by one or more of the processor 204 (FIG. 2), the memory 206 (FIG. 2), the DSP 220 (FIG. 2), and the receiver 212 (FIG. 2).

In an embodiment, the means 730 for determining suitability of the communication link based on the first communication can be configured to perform one or more of the functions described above with respect to block 630 (FIG. 6). In various embodiments, the means 730 for determining suitability of the communication link based on the first communication can be implemented by one or more of the processor 204 (FIG. 2), the memory 206 (FIG. 2), and the DSP 220 (FIG. 2).

In an embodiment, the means 740 for storing information identifying the determined suitability of a plurality of networks can be configured to perform one or more of the functions described above with respect to block 640 (FIG. 6). In various embodiments, the means 740 for storing information identifying the determined suitability of a plurality of networks can be implemented by one or more of the processor 204 (FIG. 2), the memory 206 (FIG. 2), and the DSP 220 (FIG. 2).

In an embodiment, the means 750 for selectively transmitting a second request for a second communication, over the communication link can be configured to perform one or more of the functions described above with respect to block 650 (FIG. 6). In various embodiments, the means 750 for selectively transmitting a second request for a second communication, over the communication link can be implemented by one or more of the processor 204 (FIG. 2), the memory 206 (FIG. 2), the DSP 220 (FIG. 2), and the transmitter 210 (FIG. 2).

Figure 8:
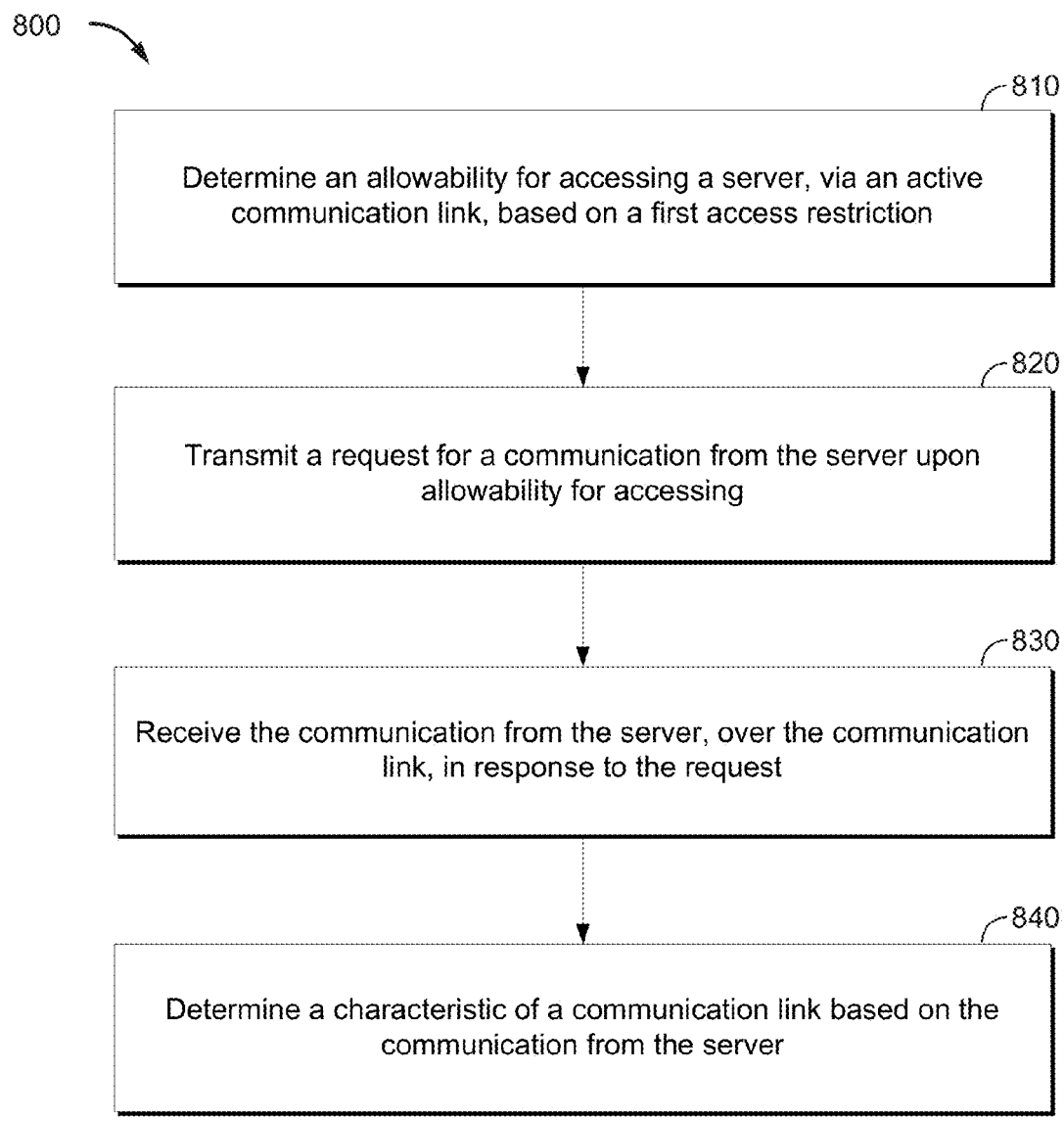
FIG. 8 is a flowchart 800 illustrating an embodiment of a method of determining a characteristic of an active communication link.

FIG. 8 is a flowchart 800 illustrating an embodiment of a method of determining a characteristic of an active communication link. Although the method of flowchart 800 is described herein with reference to the wireless communication system 100 discussed above with respect to FIG. 2, and to the wireless device 202 discussed above with respect to FIG. 2, a person having ordinary skill in the art will appreciate that the method of flowchart 800 may be implemented by another device described herein, or any other suitable device. In an embodiment, the steps in flowchart 800 may be performed, at least in part, by a processor or controller such as, for example, the processor 204 (FIG. 2) and/or the DSP 220 (FIG. 2), potentially in conjunction with the memory 206 (FIG. 2). Although the method of flowchart 800 is described herein with reference to a particular order, in various embodiments, blocks herein may be performed in a different order, or omitted, and additional blocks may be added.

First, at block 810, the STA 106 determines an allowability for accessing the server 116 via an active communication link. The active communication link can be, for example, the communication link 112. The STA 106 determines allowability for accessing the server 116 based on a first access restriction. In an embodiment, the first access restriction can include the device management information 310, discussed above with respect to FIG. 3. For example, the first access restriction can include the access probability factor 330 (FIG. 3), the quality estimation quota 340, the BQE cache period 350, the BQE history limit 360, the passive BQE command 370, and/or other information indicating how or when the wireless device 202s should perform BQE. In various embodiments, the first access restriction can include analogous ICD device management information as discussed above with respect to FIG. 5 such as, for example, the ICD quota, the ICD cache period, the ICD history limit 360, and/or other information indicating how or when the STA 106 should perform ICD.

The processor 204 can determine whether the server 116 is available for BQE and/or ICD as discussed above with respect to FIG. 2. In an embodiment, the STA 106 connects to a communication network, such as the communication network 100 (FIG. 1). In an embodiment, the processor 202 causes the transmitter 210 to associate the wireless device 202s with the AP 104. In an embodiment, the processor 204 may attempt BQE and/or ICD every time the wireless device 202s connects to a communication network. For example, the processor 204 may attempt BQE and/or ICD every time the wireless device 202s associates with an AP, such as the AP 104.

Then, at block 820, the STA 106 transmits a request for a communication from the server 116 when access to the server is available. In various embodiments, the request can include one or more of a BQE request and an ICD request, as discussed above with respect to FIGS. 2-4. The transmitter 210 may transmit the request to the server 116 via the antenna 216. The communication can include one or more of a BQE response and an ICD response, as discussed above with respect to FIGS. 2-4.

Subsequently, at block 830, the STA 106 receives the communication from the server 116, over the communication link, in response to the request. In an embodiment, the communication link can include the backhaul communication link 112. The communication can include one or more of a BQE response and an ICD response, as discussed above with respect to FIGS. 2-4. Accordingly, the communication from the server 116 can include the access probability factor 330 (FIG. 3), the quality estimation quota 340, the BQE cache period 350, the BQE history limit 360, the passive BQE command 370, and/or other information indicating how or when the wireless device 202s should perform BQE. In various embodiments, the communication can include analogous ICD device management information as discussed above with respect to FIG. 5 such as, for example, the ICD quota, the ICD cache period, the ICD history limit 360, and/or other information indicating how or when the STA 106 should perform ICD. The receiver 212 may receive the communication from the server 116 via the antenna 216.

Thereafter, at block 840, the STA 106 determines a characteristic of the communication link 112 based on the communication from the server 116. In various embodiments, the characteristic can include one or more of a BQE result and an ICD result. The characteristic can include a quality metric based on the response from the server 116. For example, the processor 204 may estimate the speed of the communication link by measuring the amount of time it takes to download the response from the server 116 and dividing the size of the quality estimation response by the transfer time. The processor 204 may estimate the latency of the communication link by measuring the amount of time it takes for the server to respond to the quality estimation request. The processor 204 may estimate the packet delay variation of the communication link by monitoring the transmission of packets and acknowledgments when receiving the response. The processor 204 may estimate the packet loss rate of the communication link by measuring the number of packets resent by the server 116 when receiving the response.

In an embodiment, the processor 204 can store the characteristic in the memory 206. The processor 204 can update the first access restriction based on the communication from the server. For example, in embodiments where the response includes the device management information 310, the processor 204 may store the device management information 310 in the memory 206 for later use in determining availability of the server 116.

Figure 9:
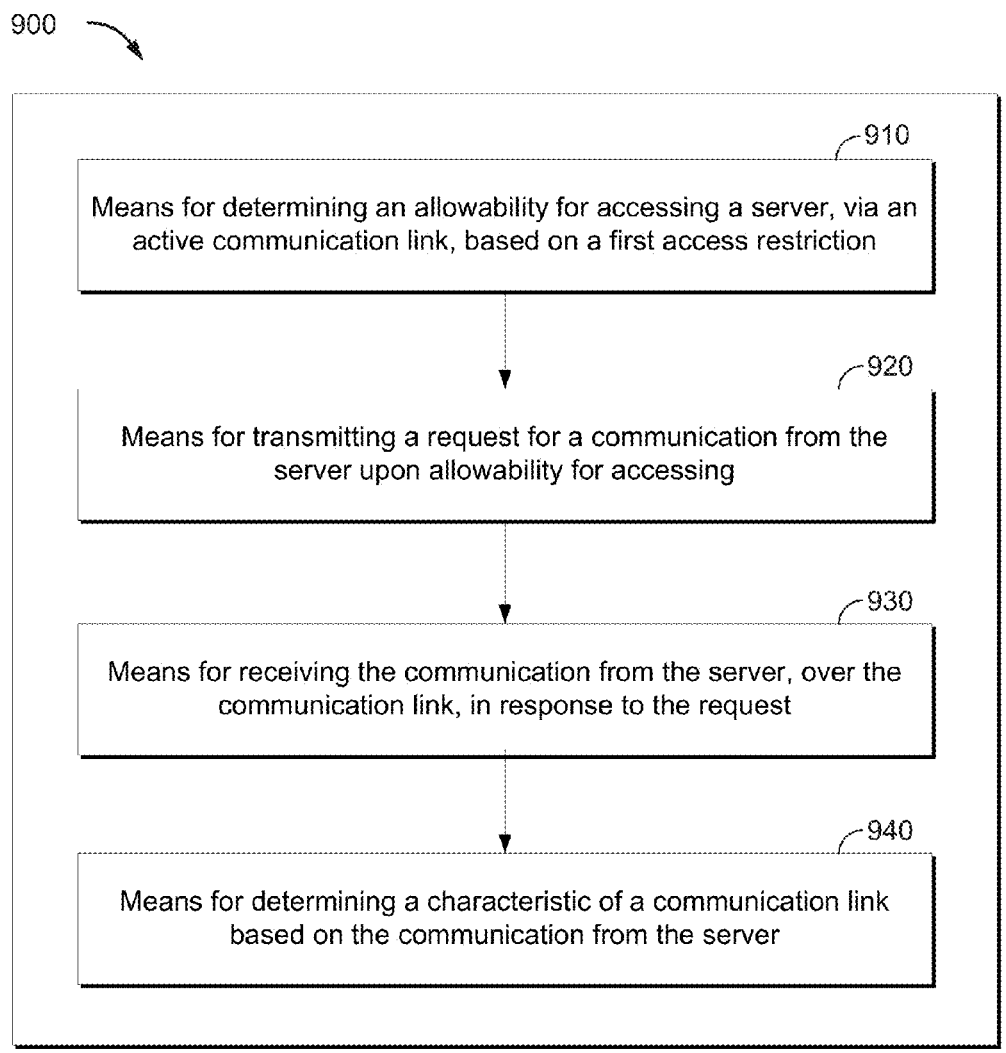
FIG. 9 is a functional block diagram of a system for determining a characteristic of an active communication link, in accordance with an exemplary embodiment of the invention.

FIG. 9 is a functional block diagram of a system 900 for determining a characteristic of an active communication link, in accordance with an exemplary embodiment of the invention. Those skilled in the art will appreciate that a system may have more components than the simplified system 900 shown in FIG. 9. The system 900 shown includes only those components useful for describing some prominent features of implementations within the scope of the claims.

The system 900 for determining a characteristic of an active communication link includes means 910 for determining an allowability for accessing a server, via the active communication link, based on a first access restriction, means 920 for transmitting a request for a communication from the server upon allowability for accessing, means 930 for receiving the communication from the server, over the communication link, in response to the request, and means 940 for determining a characteristic of a communication link based on the communication from the server.

In an embodiment, the means 910 for determining an allowability for accessing a server, via the active communication link, based on a first access restriction can be configured to perform one or more of the functions described above with respect to block 810 (FIG. 8). In various embodiments, the means 910 for determining an allowability for accessing a server, via the active communication link, based on a first access restriction can be implemented by one or more of the processor 204 (FIG. 2), the memory 206 (FIG. 2), and the DSP 220 (FIG. 2).

In an embodiment, the means 920 for transmitting a request for a communication from the server upon allowability for accessing can be configured to perform one or more of the functions described above with respect to block 820 (FIG. 8). In various embodiments, the means 920 for transmitting a request for a communication from the server upon allowability for accessing can be implemented by one or more of the processor 204 (FIG. 2), the memory 206 (FIG. 2), the DSP 220 (FIG. 2), and the transmitter 210 (FIG. 2).

In an embodiment, the means 930 for receiving the communication from the server, over the communication link, in response to the request can be configured to perform one or more of the functions described above with respect to block 830 (FIG. 8). In various embodiments, the means 930 for receiving the communication from the server, over the communication link, in response to the request can be implemented by one or more of the processor 204 (FIG. 2), the memory 206 (FIG. 2), the DSP 220 (FIG. 2), and the receiver 212 (FIG. 2).

In an embodiment, the means 940 for determining a characteristic of a communication link based on the communication from the server can be configured to perform one or more of the functions described above with respect to block 840 (FIG. 8). In various embodiments, the means 940 for determining a characteristic of a communication link based on the communication from the server can be implemented by one or more of the processor 204 (FIG. 2), the memory 206 (FIG. 2), and the DSP 220 (FIG. 2).

Figure 10:
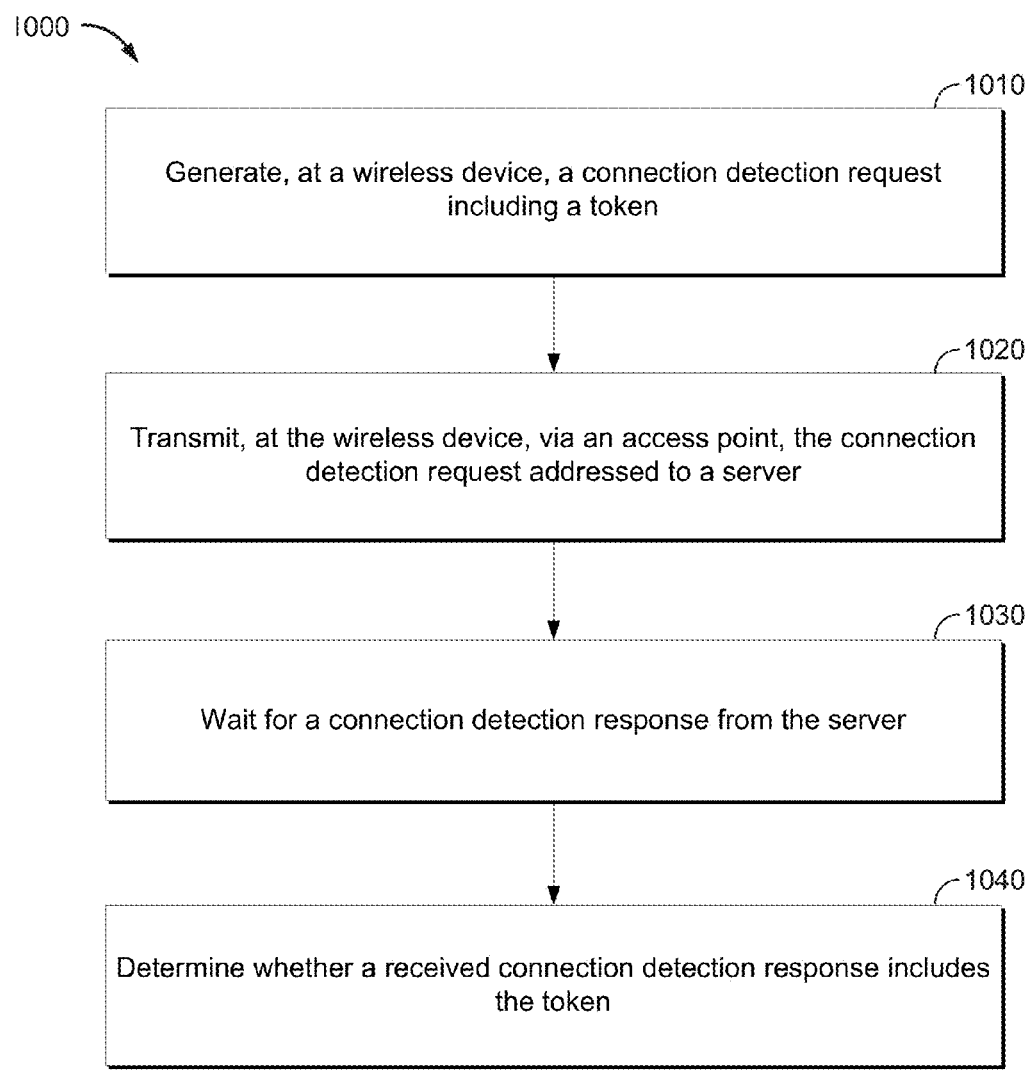
FIG. 10 is a flowchart illustrating an embodiment of a method of detecting connectivity to a server through an access point.

FIG. 10 is a flowchart 1000 illustrating an embodiment of a method of detecting connectivity to a server through an access point. Although the method of flowchart 1000 is described herein with reference to the wireless communication system 100 discussed above with respect to FIG. 2, and to the wireless device 202 discussed above with respect to FIG. 2, a person having ordinary skill in the art will appreciate that the method of flowchart 1000 may be implemented by another device described herein, or any other suitable device. In an embodiment, the steps in flowchart 1000 may be performed, at least in part, by a processor or controller such as, for example, the processor 204 (FIG. 2) and/or the DSP 220 (FIG. 2), potentially in conjunction with the memory 206 (FIG. 2). Although the method of flowchart 1000 is described herein with reference to a particular order, in various embodiments, blocks herein may be performed in a different order, or omitted, and additional blocks may be added.

First, at block 1010, the STA 106 generates a connection detection request including a token. In an embodiment, the connection detection request can include the ICD request described above with respect to FIG. 5. The token can include the temporary identifier described above with respect to FIG. 5. For example, the token can include a key such as, for example, the BSSID of the AP 104. The token can allow the STA 106 to distinguish between a valid ICD response and "captive portal" information such as, for example, redirected or spoofed login prompt, payment prompt, etc.

In an embodiment, the STA 106 connects to a communication network, such as the communication network 100 (FIG. 1). In an embodiment, the processor 202 causes the transmitter 210 to associate the wireless device 202s with the AP 104. In an embodiment, the processor 204 may attempt ICD every time the wireless device 202s connects to a communication network. For example, the processor 204 may attempt ICD every time the wireless device 202s associates with an AP, such as the AP 104.

Then, at block 1120, the STA 106 transmits, via the AP 104, the connection detection request addressed to a server such as, for example, the server 116. The STA 106 can transmit the connection detection request via the transmitter 210, over the backhaul communication link 112. The connection detection request can include an ICD HTTP GET for the ICD URI to the server 116.

Next, at block 1130, the STA 106 waits for a connection detection response from the server 116. In an embodiment, the connection detection response can include the ICD response, described above with respect to FIGS. 2-5. In an embodiment, the processor 204 may wait an amount of time for a response from the server 116. The amount of time may be an ICD timeout value. If the ICD response is not received within the ICD timeout, the processor may determine that the AP 104 does not provide Internet connectivity.

Subsequently, at block 1140, the STA 106 determines whether a received connection detection response includes the token. In an embodiment, if the ICD response includes the key in an expected position, the processor 204 may determine that the AP 104 provides Internet connectivity. If the ICD response is malformed (for example, missing the token), the processor may determine that the AP 104 does not provide Internet connectivity. In an embodiment, the processor 204 may generate and send a DNS request in order to determine the IP address of the server 116. If the DNS request fails, the processor 204 may determine that the AP 104 does not provide Internet access at block 710. Regardless of whether ICD succeeds or fails, the processor 204 may store the ICD result in the memory 206.

Figure 11:
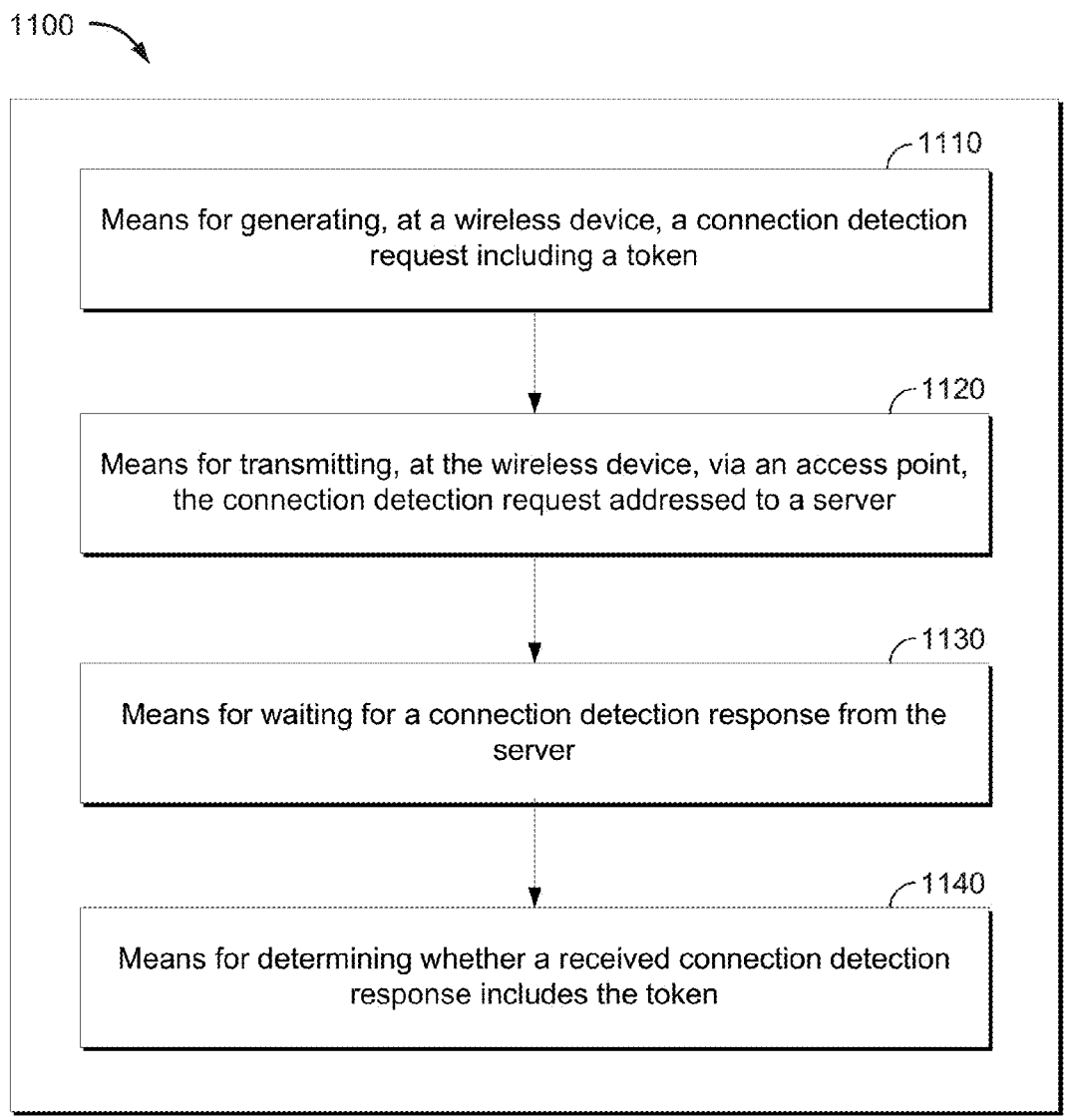
FIG. 11 is a functional block diagram of a system for detecting connectivity to a server through an access point, in accordance with an exemplary embodiment of the invention.

FIG. 11 is a functional block diagram of a system 1100 for detecting connectivity to a server through an access point, in accordance with an exemplary embodiment of the invention. Those skilled in the art will appreciate that a system may have more components than the simplified system 1100 shown in FIG. 11. The system 1100 shown includes only those components useful for describing some prominent features of implementations within the scope of the claims.

The system 1100 for detecting connectivity to a server through an access point includes means 1110 for generating, at a wireless device, a connection detection request including a token, means 1120 for transmitting, at the wireless device, via the access point, the connection detection request addressed to a server, means 1130 for waiting for a connection detection response from the server, and means 1140 for determining whether a received connection detection response includes the token.

In an embodiment, the means 1110 for generating, at a wireless device, a connection detection request including a token can be configured to perform one or more of the functions described above with respect to block 1010 (FIG. 10). In various embodiments, the means 1110 for generating, at a wireless device, a connection detection request including a token can be implemented by one or more of the processor 204 (FIG. 2), the memory 206 (FIG. 2), and the DSP 220 (FIG. 2).

In an embodiment, the means 1120 for transmitting, at the wireless device, via the access point, the connection detection request addressed to a server can be configured to perform one or more of the functions described above with respect to block 1020 (FIG. 10). In various embodiments, the means 1120 for transmitting, at the wireless device, via the access point, the connection detection request addressed to a server can be implemented by one or more of the processor 204 (FIG. 2), the memory 206 (FIG. 2), the DSP 220 (FIG. 2), and the transmitter 210 (FIG. 2).

In an embodiment, the means 1130 for waiting for a connection detection response from the server can be configured to perform one or more of the functions described above with respect to block 1030 (FIG. 10). In various embodiments, the means 1130 for waiting for a connection detection response from the server can be implemented by one or more of the processor 204 (FIG. 2), the memory 206 (FIG. 2), and the DSP 220 (FIG. 2).

In an embodiment, the means 1140 for determining whether a received connection detection response includes the token can be configured to perform one or more of the functions described above with respect to block 1040 (FIG. 10). In various embodiments, the means 1140 for determining whether a received connection detection response includes the token can be implemented by one or more of the processor 204 (FIG. 2), the memory 206 (FIG. 2), and the DSP 220 (FIG. 2).

Figure 12:
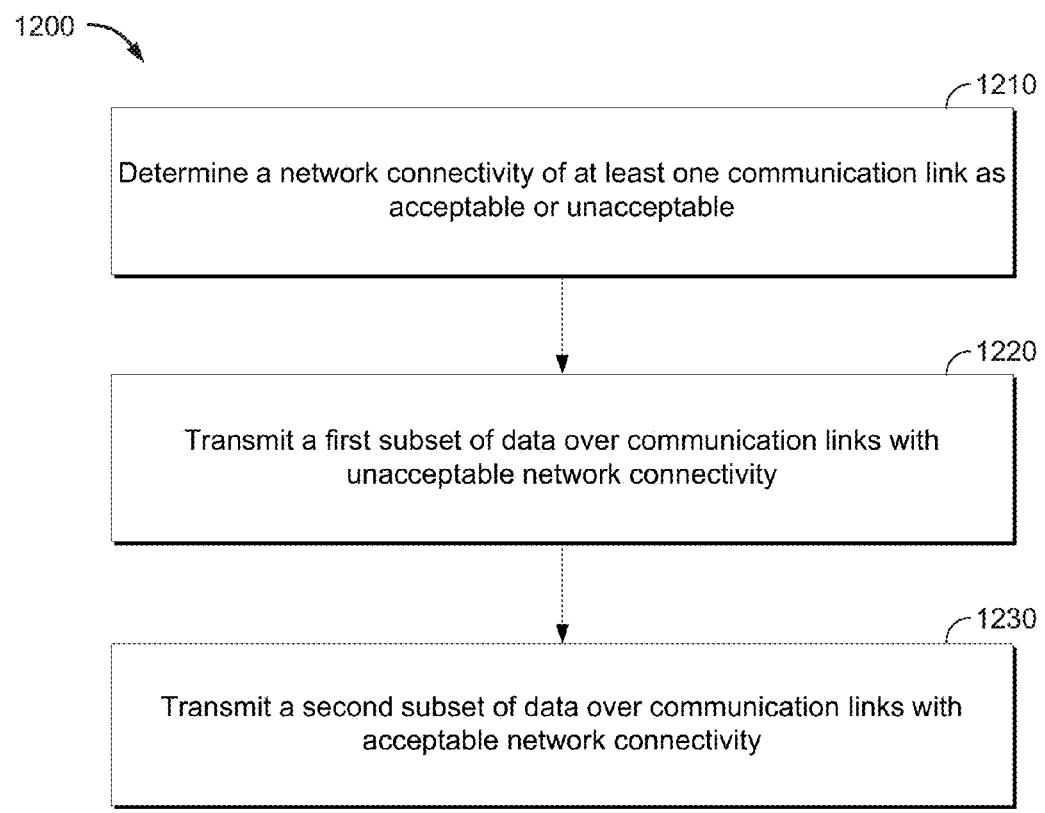
FIG. 12 is a flowchart illustrating an embodiment of a method of communicating in a wireless network.

FIG. 12 is a flowchart 1200 illustrating an embodiment of a method of communicating in a wireless network. Although the method of flowchart 1200 is described herein with reference to the wireless communication system 120 discussed above with respect to FIG. 2, and to the wireless device 202 discussed above with respect to FIG. 2, a person having ordinary skill in the art will appreciate that the method of flowchart 1200 may be implemented by another device described herein, or any other suitable device. In an embodiment, the steps in flowchart 1200 may be performed, at least in part, by a processor or controller such as, for example, the processor 204 (FIG. 2) and/or the DSP 220 (FIG. 2), potentially in conjunction with the memory 206 (FIG. 2). Although the method of flowchart 1200 is described herein with reference to a particular order, in various embodiments, blocks herein may be performed in a different order, or omitted, and additional blocks may be added.

First, at block 1210, the STA 106 determines a network connectivity of at least one communication link as acceptable or unacceptable. In various embodiments, the STA 106 can determine the network connectivity of the backhaul communication link 112, or another link associated with the AP 104, as acceptable or unacceptable in accordance with the flowcharts 400 and/or 500, described above with respect to FIGS. 4 and 5, respectively. The STA 106 can determine network connectivity for each of one or more available communication links and/or APs not shown in FIG. 1 such as, for example, WiFi links, cellular links, Bluetooth links, etc.

For example, the STA 106 can perform ICD as described herein, and determine that network connectivity of a communication link is acceptable when the AP 104 provides Internet connectivity, and unacceptable when the AP 104 does not provide Internet connectivity. In an embodiment, the STA 106 can perform BQE as described herein and determine that network connectivity of a communication link is acceptable when the BQE result surpasses a threshold, and unacceptable when the BQE result does not surpass the threshold.

Next, at block 1220, the STA 106 transmits a first subset of data over one or more communication links with unacceptable network connectivity. In an embodiment, the STA 106 transmits the first subset of data over each communication link with unacceptable network connectivity. In circumstances where there the AP 104 is a "captive portal," transmitting the first subset of data over unacceptable communication links may allow a user to access a login prompt, payment prompt, etc. Transmitting the first subset of data over unacceptable communication links may further allow the STA 106 to detect changes in network connectivity. The processor 204 can transmit the first subset of data via the transmitter 210.

Then, at block 1230, the STA 106 transmits a second subset of data over one or more communication links with acceptable network connectivity. In an embodiment, the STA 106 transmits the first subset of data over each communication link with acceptable network connectivity. Transmitting the second subset of data over acceptable communication links may increase the reliability and quality of network access. In various embodiments, the first and second subset of data may be intersecting or non-intersecting. In an embodiment, the STA 106 can continuously, periodically, or intermittently re-determine network connectivity of one or more communication links such as, for example, the communication links with unacceptable connectivity. The processor 204 can transmit the second subset of data via the transmitter 210.

Figure 13:
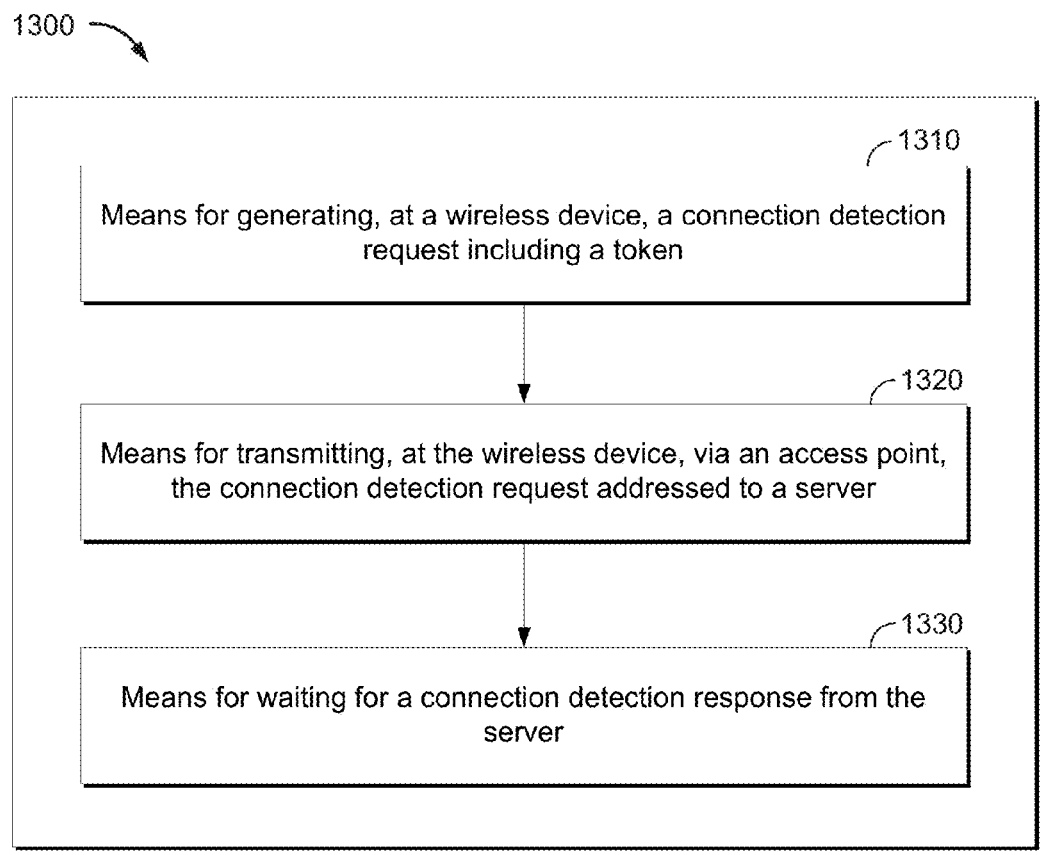
FIG. 13 is a functional block diagram of a system for communicating in a wireless network, in accordance with an exemplary embodiment of the invention.

FIG. 13 is a functional block diagram of a system 1300 for communicating in a wireless network, in accordance with an exemplary embodiment of the invention. Those skilled in the art will appreciate that a system may have more components than the simplified system 1300 shown in FIG. 13. The system 1300 shown includes only those components useful for describing some prominent features of implementations within the scope of the claims.

The system 1300 for communicating in a wireless network includes means 1310 for determining a network connectivity of at least one communication link as acceptable or unacceptable, means 1320 for transmitting a first subset of data over communication links with unacceptable network connectivity, and means 1330 for transmitting a second subset of data over communication links with acceptable network connectivity.

In an embodiment, the means 1310 for determining a network connectivity of at least one communication link as acceptable or unacceptable can be configured to perform one or more of the functions described above with respect to block 1210 (FIG. 12). In various embodiments, the means 1310 for determining a network connectivity of at least one communication link as acceptable or unacceptable can be implemented by one or more of the processor 204 (FIG. 2), the memory 206 (FIG. 2), the DSP 220 (FIG. 2), the transmitter 210, and the receiver 212.

In an embodiment, the means 1320 for transmitting a first subset of data over communication links with unacceptable network connectivity can be configured to perform one or more of the functions described above with respect to block 1220 (FIG. 12). In various embodiments, the means 1320 for transmitting a first subset of data over communication links with unacceptable network connectivity can be implemented by one or more of the processor 204 (FIG. 2), the memory 206 (FIG. 2), the DSP 220 (FIG. 2), and the transmitter 210.

In an embodiment, the means 1330 for transmitting a second subset of data over communication links with acceptable network connectivity can be configured to perform one or more of the functions described above with respect to block 1230 (FIG. 12). In various embodiments, the means 1330 for transmitting a second subset of data over communication links with acceptable network connectivity can be implemented by one or more of the processor 204 (FIG. 2), the memory 206 (FIG. 2), the DSP 220 (FIG. 2), and the transmitter 210.

Figure 14:
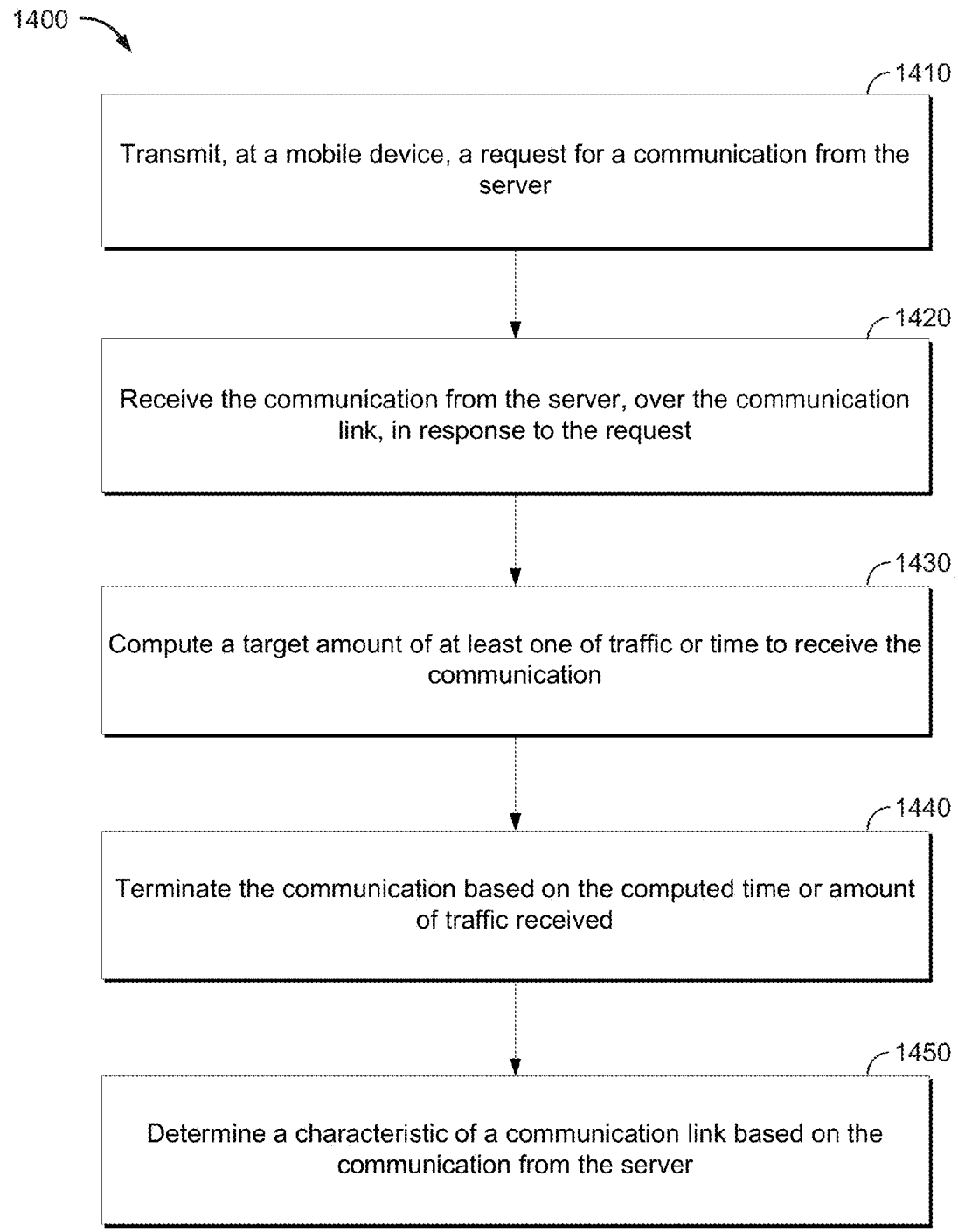
FIG. 14 is a flowchart illustrating an embodiment of another method of determining a characteristic of a communication link.

FIG. 14 is a flowchart 1400 illustrating an embodiment of another method of determining a characteristic of a communication link. Although the method of flowchart 1400 is described herein with reference to the wireless communication system 100 discussed above with respect to FIG. 2, and to the wireless device 202 discussed above with respect to FIG. 2, a person having ordinary skill in the art will appreciate that the method of flowchart 1400 may be implemented by another device described herein, or any other suitable device. In an embodiment, the steps in flowchart 1400 may be performed, at least in part, by a processor or controller such as, for example, the processor 204 (FIG. 2) and/or the DSP 220 (FIG. 2), potentially in conjunction with the memory 206 (FIG. 2). Although the method of flowchart 1400 is described herein with reference to a particular order, in various embodiments, blocks herein may be performed in a different order, or omitted, and additional blocks may be added.

First, at block 1410, the STA 106 transmits a request for a communication to the server 116, over the communication link 112. The communication can be for determining suitability of the communication link 112. In various embodiments, the request can include one or more of a BQE request and an ICD request, as discussed above with respect to FIGS. 2-4. The communication can include one or more of a BQE response and an ICD response, as discussed above with respect to FIGS. 2-4.

Next, at block 1420, the STA 106 receives the communication from the server 116, in response to the request. The server 116 can send the communication over the communication link 112. The STA 106 can receive the first communication via the receiver 212.

Then, at block 1430, the STA 106 computes a target amount of at least one of traffic or time to receive the communication. In an embodiment, the STA can compute a target amount of data to download while performing BQE, as discussed above with respect to FIG. 2. In an embodiment, the STA can compute a BQE timeout indicating a maximum time during which the BQE response should be downloaded, as discussed above with respect to FIG. 2. The STA 106 may compute a requested file size, and the target amount of data to download can be less than the requested file size.

In an embodiment, the STA 106 can estimate a round trip time to the server. The STA 106 can request a file from the server and measure a response time. The STA 106 can estimate a segment size used by a transport protocol. The STA 106 can determine a maximum estimation rate. The STA 106 can determine a number of transport flows to use. The STA 106 can compute the target based on one or more of: a first ratio of the an amount of time a transport protocol spends in a congestion avoidance mode to the amount of time the transport protocol spends in a slow start mode, a number of transport flows, an estimated round trip time, an estimated segment size, and an maximum estimation rate.

Subsequently, at block 1440, the STA 106 terminates the communication based on the computed time or amount of traffic received. For example, the STA 106 can monitor the amount of traffic received during BQE and terminate receipt of the BQE response when the amount of traffic received surpasses the computed target amount of traffic. In another example, the STA 106 can measure the amount of time it has taken to transfer the BQE response, and can terminate receipt of the BQE response when the measure amount of time surpasses the computed target amount of time. Accordingly, the STA 106 can terminate transfer of the BQE response before the BQE response is completely downloaded.

Thereafter, at block 1450, the STA 106 determines a characteristic of the communication link 112 based on the communication from the server 116. In various embodiments, the characteristic can include one or more of a BQE result and an ICD result. The characteristic can include a quality metric based on the response from the server 116. For example, the processor 204 may estimate the speed of the communication link by measuring the amount of time it takes to download the response from the server 116 and dividing the size of the quality estimation response by the transfer time. The processor 204 may estimate the latency of the communication link by measuring the amount of time it takes for the server to respond to the quality estimation request. The processor 204 may estimate the packet delay variation of the communication link by monitoring the transmission of packets and acknowledgments when receiving the response. The processor 204 may estimate the packet loss rate of the communication link by measuring the number of packets resent by the server 116 when receiving the response.

In an embodiment, the processor 204 can store the characteristic in the memory 206. The processor 204 can update the first access restriction based on the communication from the server. For example, in embodiments where the response includes the device management information 310, the processor 204 may store the device management information 310 in the memory 206 for later use in determining availability of the server 116.

Figure 15:
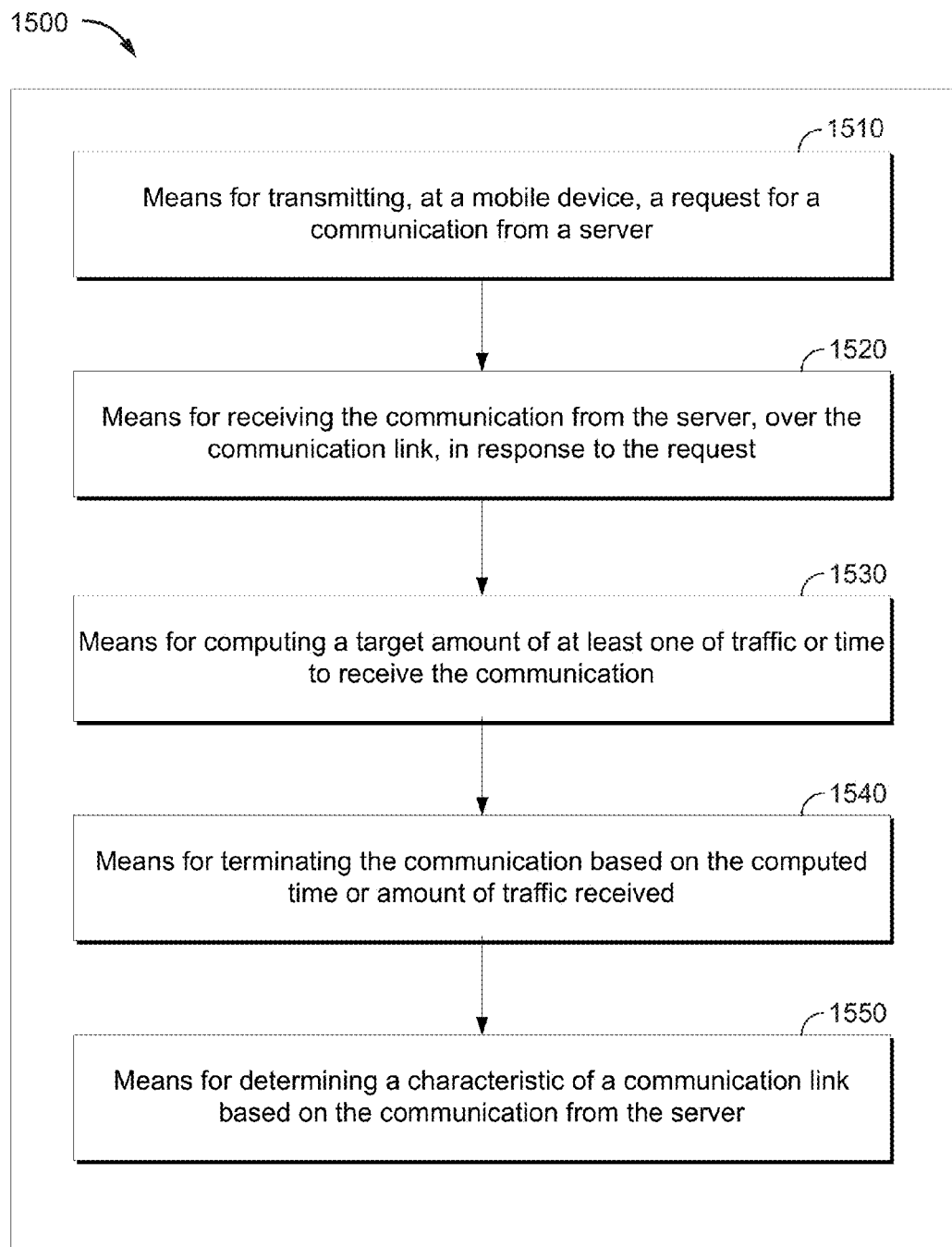
FIG. 15 is a functional block diagram of another system for determining a characteristic of a communication link, in accordance with an exemplary embodiment of the invention.

FIG. 15 is a functional block diagram of another system 1500 for determining a characteristic of a communication link, in accordance with an exemplary embodiment of the invention. Those skilled in the art will appreciate that a system may have more components than the simplified system 1500 shown in FIG. 15. The system 1500 shown includes only those components useful for describing some prominent features of implementations within the scope of the claims.

The system 1500 for determining a characteristic of a communication link includes means 1510 for transmitting, at a mobile device, a request for a communication from a server, means 1520 for receiving the communication from the server, over the communication link, in response to the request, means 1530 for computing a target amount of at least one of traffic or time to receive the communication, means 1540 for terminating the communication based on the computed time or amount of traffic received, and means 1550 for determining a characteristic of a communication link based on the communication from the server.

In an embodiment, the means 1510 for transmitting, at a mobile device, a request for a communication from a server can be configured to perform one or more of the functions described above with respect to block 1410 (FIG. 14). In various embodiments, the means 1510 for transmitting, at a mobile device, a request for a communication from a server can be implemented by one or more of the processor 204 (FIG. 2), the memory 206 (FIG. 2), the DSP 220 (FIG. 2), and the transmitter 210 (FIG. 2).

In an embodiment, the means 1520 for receiving the communication from the server, over the communication link, in response to the request can be configured to perform one or more of the functions described above with respect to block 1420 (FIG. 14). In various embodiments, the means 1520 for receiving the communication from the server, over the communication link, in response to the request can be implemented by one or more of the processor 204 (FIG. 2), the memory 206 (FIG. 2), the DSP 220 (FIG. 2), and the receiver 212 (FIG. 2).

In an embodiment, the means 1530 for computing a target amount of at least one of traffic or time to receive the communication can be configured to perform one or more of the functions described above with respect to block 1430 (FIG. 14). In various embodiments, the means 1530 for computing a target amount of at least one of traffic or time to receive the communication can be implemented by one or more of the processor 204 (FIG. 2), the memory 206 (FIG. 2), and the DSP 220 (FIG. 2).

In an embodiment, the means 1540 for terminating the communication based on the computed time or amount of traffic received can be configured to perform one or more of the functions described above with respect to block 1440 (FIG. 14). In various embodiments, the means 1540 for terminating the communication based on the computed time or amount of traffic received can be implemented by one or more of the processor 204 (FIG. 2), the memory 206 (FIG. 2), the DSP 220 (FIG. 2), and the transmitter 210 (FIG. 2).

In an embodiment, the means 1550 for determining a characteristic of a communication link based on the communication from the server can be configured to perform one or more of the functions described above with respect to block 1550 (FIG. 14). In various embodiments, the means 1550 for determining a characteristic of a communication link based on the communication from the server can be implemented by one or more of the processor 204 (FIG. 2), the memory 206 (FIG. 2), and the DSP 220 (FIG. 2).

Figure 16:
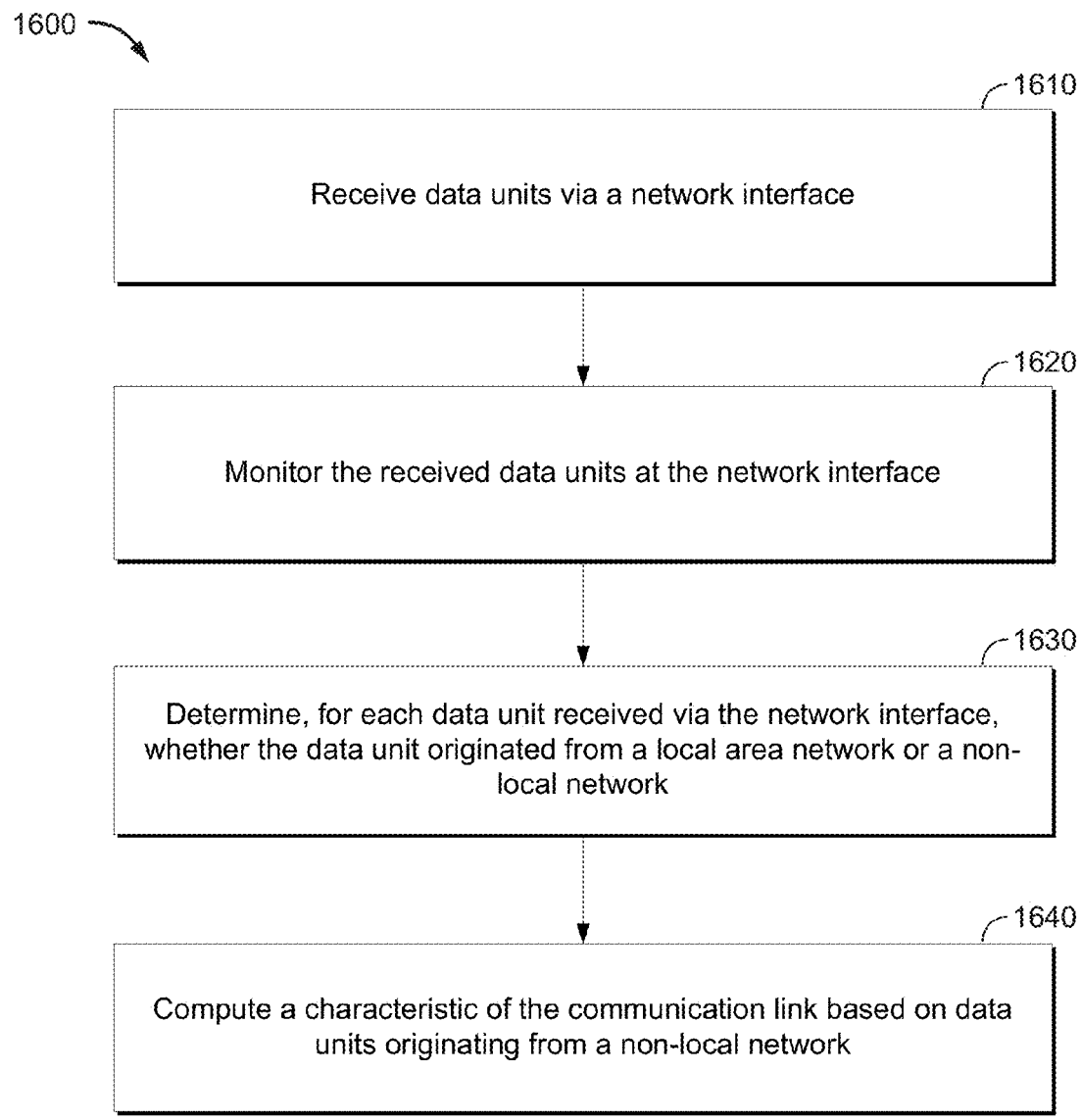
FIG. 16 is a flowchart illustrating an embodiment of a estimating a quality of a communication link.

FIG. 16 is a flowchart 1600 illustrating an embodiment of a estimating a quality of a communication link. Although the method of flowchart 1600 is described herein with reference to the wireless communication system 100 discussed above with respect to FIG. 2, and to the wireless device 202 discussed above with respect to FIG. 2, a person having ordinary skill in the art will appreciate that the method of flowchart 1600 may be implemented by another device described herein, or any other suitable device. In an embodiment, the steps in flowchart 1600 may be performed, at least in part, by a processor or controller such as, for example, the processor 204 (FIG. 2) and/or the DSP 220 (FIG. 2), potentially in conjunction with the memory 206 (FIG. 2). Although the method of flowchart 1600 is described herein with reference to a particular order, in various embodiments, blocks herein may be performed in a different order, or omitted, and additional blocks may be added.

First, at block 1610, the STA 106 receives a plurality of data units via a network interface. For example, the STA 106 can receive the data units via the receiver 212. In an embodiment, the STA 106 may receive a portion of data units from a local area network such as, for example, from another STA 106 connected to the AP 104. Accordingly, the data units received from the local area network may not indicate the quality or connectivity of the backhaul communication link 112. The STA 106 may receive another portion of data units from a non-local network such as, for example, the network 114. The data units received from the non-local network may indicate the quality or connectivity of the backhaul communication link 112.

Next, at block 1620, the STA 106 monitors the received data units at the network interface. In an embodiment, the STA 106 may count bytes received at the receiver 212, and may determine the source address, source subnet, or other network information related to the received data units. In an embodiment, the server 116 may transmit one or more data units to the STA 106 via the communication link 112. At the same time, another STA connected to the AP 104 may transmit one or more data units to the STA 106.

Then, at block 1630, the STA 106 determines, for each data unit received via the network interface, whether the data unit originated from a local area network or a non-local network. For example, the processor 204 can determine a subnet of the receiver 212 and a subnet of a received packet. The processor 204 can determine that a received packet originated from a local area network when the subnet of the packet matches the subnet of the receiver 212. The processor 204 can determine that the received packet originated from a non-local area network when the subnet of the packet does not match the subnet of the receiver 212.

In various embodiments, the processor 204 can use other identifying information in the packet in order to distinguish local from non-local traffic including, but not limited to, header information (such as a source IP, a source subnet, a time-to-live (TTL), a multicast or broadcast attribute, etc.) and payload information (such as identifying information included in the payload by the server 116, for example). Local traffic may also be defined by a number of hops or determined by tracing a route to the source.

Thereafter, at block 1650, the STA 106 determines a characteristic of the communication link 112 based on data units originating from a non-local network. The STA 106 may only consider non-local data units when determining the characteristic. The STA 106 may separately consider local data units when determining a characteristic of another communication link.

In various embodiments, the characteristic can include one or more of a BQE result and an ICD result. The characteristic can include a quality metric based on the response from the server 116. For example, the processor 204 may estimate the speed of the communication link by measuring the amount of time it takes to download the response from the server 116 and dividing the size of the quality estimation response by the transfer time. The processor 204 may estimate the latency of the communication link by measuring the amount of time it takes for the server to respond to the quality estimation request. The processor 204 may estimate the packet delay variation of the communication link by monitoring the transmission of packets and acknowledgments when receiving the response. The processor 204 may estimate the packet loss rate of the communication link by measuring the number of packets resent by the server 116 when receiving the response.

In an embodiment, the processor 204 can store the characteristic in the memory 206. The processor 204 can update the first access restriction based on the communication from the server. For example, in embodiments where the response includes the device management information 310, the processor 204 may store the device management information 310 in the memory 206 for later use in determining availability of the server 116.

In an embodiment, the STA 106 can start measuring a transfer rate when the network interface becomes available. For example, STA 106 can perform passive BQE after connecting to the AP 104. The STA 106 can start a timer when the network interface becomes available, and can stop measurement after the timer reaches a threshold. During measurement, the STA 106 can count bytes received via the network interface and discard or otherwise discount bytes originating from a local network. The STA 106 can compute one or more burst rate samples as described above with respect to FIG. 2. The STA 106 can average the rate of a number of the highest burst rate samples.

Figure 17:
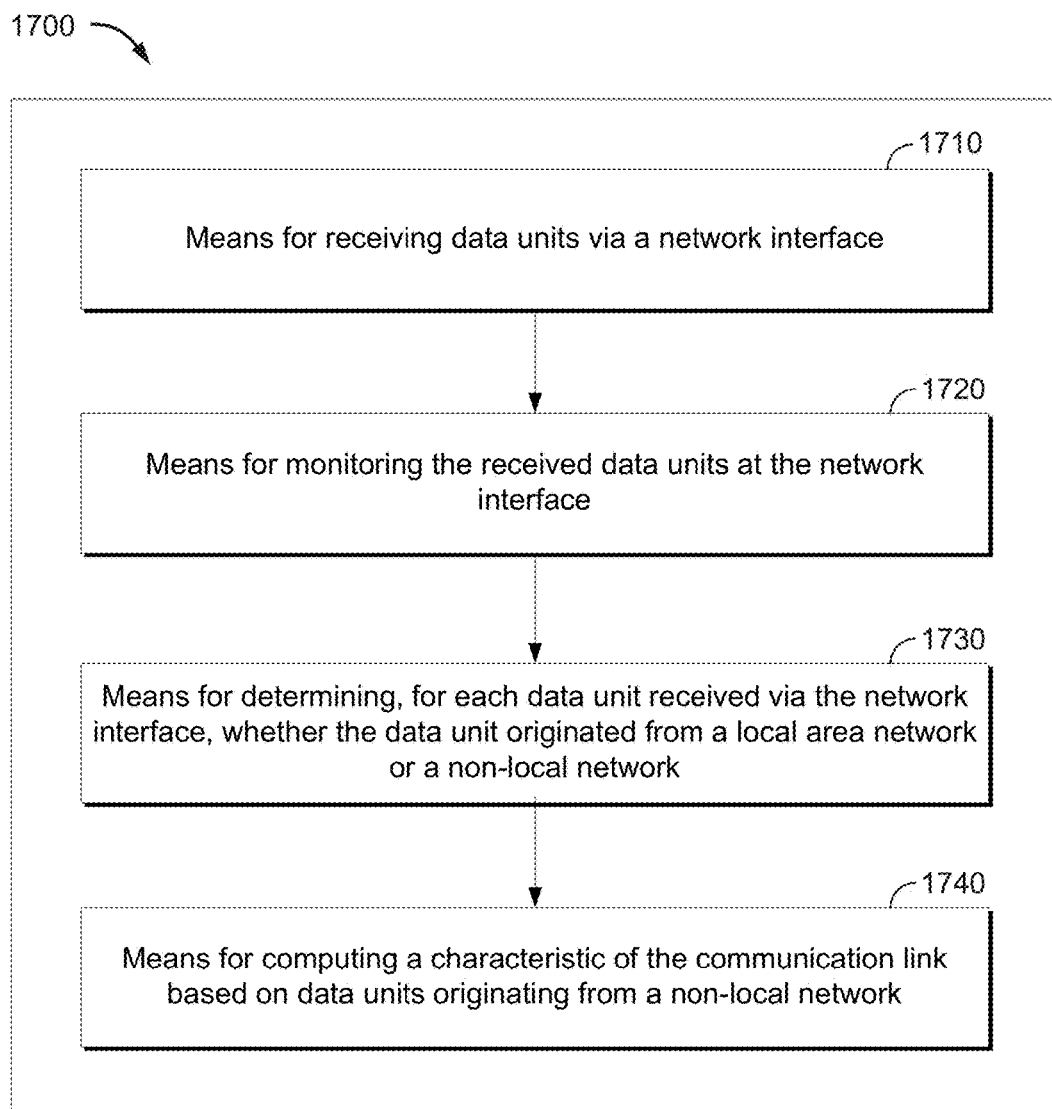
FIG. 17 is a functional block diagram of a system for estimating a quality of a communication link, in accordance with an exemplary embodiment of the invention.

FIG. 17 is a functional block diagram of a system 1700 for estimating a quality of a communication link, in accordance with an exemplary embodiment of the invention. Those skilled in the art will appreciate that a system may have more components than the simplified system 1700 shown in FIG. 17. The system 1700 shown includes only those components useful for describing some prominent features of implementations within the scope of the claims.

The system 1700 for estimating a quality of a communication link includes means 1710 for receiving data units via a network interface, means 1720 for monitoring the received data units at the network interface, means 1730 for determining, for each data unit received via the network interface, whether the data unit originated from a local area network or a non-local network, and means 1740 for computing a characteristic of the communication link based on data units originating from a non-local network.

In an embodiment, the means 1710 for receiving data units via a network interface can be configured to perform one or more of the functions described above with respect to block 1610 (FIG. 16). In various embodiments, the means 1710 for receiving data units via a network interface can be implemented by one or more of the processor 204 (FIG. 2), the memory 206 (FIG. 2), the DSP 220 (FIG. 2), and the receiver 212 (FIG. 2).

In an embodiment, the means 1720 for monitoring the received data units at the network interface can be configured to perform one or more of the functions described above with respect to block 1620 (FIG. 16). In various embodiments, the means 1720 for monitoring the received data units at the network interface can be implemented by one or more of the processor 204 (FIG. 2), the memory 206 (FIG. 2), and the DSP 220 (FIG. 2).

In an embodiment, the means 1730 for determining, for each data unit received via the network interface, whether the data unit originated from a local area network or a non-local network can be configured to perform one or more of the functions described above with respect to block 1630 (FIG. 16). In various embodiments, the means 1730 for determining, for each data unit received via the network interface, whether the data unit originated from a local area network or a non-local network can be implemented by one or more of the processor 204 (FIG. 2), the memory 206 (FIG. 2), and the DSP 220 (FIG. 2).

In an embodiment, the means 1740 for computing a characteristic of the communication link based on data units originating from a non-local network can be configured to perform one or more of the functions described above with respect to block 1640 (FIG. 16). In various embodiments, the means 1740 for computing a characteristic of the communication link based on data units originating from a non-local network can be implemented by one or more of the processor 204 (FIG. 2), the memory 206 (FIG. 2), and the DSP 220 (FIG. 2).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the FIGs. may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein may be downloaded and/or otherwise obtained by a user terminal and/or base station as applicable. For example, such a device may be coupled to a server to facilitate the transfer of means for performing the methods described herein. Alternatively, various methods described herein may be provided via storage means (e.g., RAM, ROM, a physical storage medium such as a compact disc (CD) or floppy disk, etc.), such that a user terminal and/or base station may obtain the various methods upon coupling or providing the storage means to the device. Moreover, any other suitable technique for providing the methods and techniques described herein to a device may be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of determining a characteristic of a communication link, the method comprising:
    determining, by a device and based on an access restriction including information associated with performing a backhaul quality estimation (BQE), an allowability for accessing a server based on receiving, from the server, information indicating whether the server is available for BQE;
    transmitting, by the device and based on determining the allowability, a request for a communication from the server;
    receiving, by the device, the communication from the server, over the communication link, in response to the request;
    computing, by the device, a target number of bytes of the communication to receive from the server while performing the BQE;
    monitoring, by the device, an amount of the communication received from the server while performing the BQE;
    terminating, by the device and based on monitoring the amount of the received communication, the communication when a received number of bytes exceeds the target number of bytes; and
    determining, by the device, a characteristic of the communication link based on a portion of the communication received from the server before termination,
        the characteristic of the communication link including a BQE result, calculated based on a response from the server, and being used to determine a potential update to the access restriction.

2. The method of claim 1, wherein
the computing further comprises:
    computing a target amount of time to receive the communication, and
the terminating comprises:
    terminating the communication when a duration of receiving the communication is greater than the target amount of time.

3. The method of claim 1, further comprising:
estimating a round trip time to the server,
wherein the estimating comprises:
    requesting a file from the server and measuring a response time, and
wherein the target number of bytes is based on the round trip time.

4. The method of claim 1, further comprising:
estimating a segment size used by a transport protocol,
wherein the target number of bytes is based on the segment size.

5. The method of claim 1, further comprising:
determining a maximum estimation rate,
wherein the target number of bytes is based on the maximum estimation rate.

6. The method of claim 1, further comprising:
determining a number of transport flows to use,
wherein the target number of bytes is based on the number of transport flows.

7. The method of claim 1, further comprising:
determining a first ratio of an amount of time a transport protocol spends in a congestion avoidance mode to an amount of time the transport protocol spends in a slow start mode,
wherein the target number of bytes is based on the first ratio.

8. The method of claim 1, further comprising:
generating the request for communication based on the target number of bytes,
wherein the request for the communication specifies a file size greater than the target number of bytes.

9. A wireless device configured to determine a characteristic of a communication link, the wireless device comprising:
    a transmitter configured to transmit a request for a communication from a server,
        the request being transmitted based on determining, using an access restriction including information associated with performing a Backhaul Quality Estimation (BQE), an allowability for accessing the server based on receiving, from the server, information indicating whether the server is available for BQE;
    a receiver configured to receive the communication from the server, over the communication link, in response to the request; and
    a processor configured to:
        compute a target number of bytes of the communication to receive from the server while performing the BQE;
        monitor an amount of the communication received from the server while performing the BQE;
        terminate, based on monitoring the amount of the received communication, the communication when a received number of bytes exceeds the target number of bytes; and
        determine a characteristic of the communication link based on a portion of the communication received from the server before termination,
            the characteristic of the communication link including a BQE result, calculated based on a response from the server, and being used to determine a potential update to the access restriction.

10. The wireless device of claim 9, wherein:
the request comprises an internet connectivity detection (ICD) request,
the communication comprises an ICD response, and
the processor is further configured to:
    determine the characteristic of the communication link by determining an Internet connectivity based on the ICD response.

11. The wireless device of claim 9, wherein the processor is further configured to:

compute the target number of bytes by computing a target amount of time to receive the communication, and
terminate the communication when a duration of receiving the communication is greater than the target amount of time.

12. The wireless device of claim 9, wherein the processor is further configured to:
estimate a round trip time to the server, wherein estimating comprises requesting a file from the server and measuring a response time,
wherein the target number of bytes is based on the round trip time.

13. The wireless device of claim 9, wherein the processor is further configured to:
estimate a segment size used by a transport protocol,
wherein the target number of bytes is based on the segment size.

14. The wireless device of claim 9, wherein the processor is further configured to:
determine a maximum estimation rate,
wherein the target number of bytes is based on the maximum estimation rate.

15. The wireless device of claim 9, wherein the processor is further configured to:
determine a number of transport flows to use,
wherein the target number of bytes is based on the number of transport flows.

16. The wireless device of claim 9, wherein the processor is further configured to:
determine a first ratio of an amount of time a transport protocol spends in a congestion avoidance mode to an amount of time the transport protocol spends in a slow start mode,
wherein the target number of bytes is based on the first ratio.

17. The wireless device of claim 9, wherein the processor is further configured to:
generate the request for communication based on the target number of bytes,
wherein the request for the communication specifies a file size greater than the target number of bytes.

18. An apparatus for determining a characteristic of a communication link, the apparatus comprising:
means for determining, based on an access restriction including information associated with performing a Backhaul Quality Estimation (BQE), an allowability for accessing a server based on receiving, from the server, information indicating whether the server is available for BQE;
means for transmitting, based on determining the allowability, a request for a communication from the server;
means for receiving the communication from the server, over the communication link, in response to the request;
means for computing a target number of bytes of the communication to receive from the server while performing the BQE;
means for monitoring an amount of the communication received from the server while performing the BQE;
means for terminating, based on monitoring the amount of the received communication, the communication when a received number of bytes exceeds the target number of bytes; and
means for determining a characteristic of the communication link based on a portion of the communication received from the server before termination,
the characteristic of the communication link including a BQE result, calculated based on a response from the server, and being used to determine a potential update to the access restriction.

19. The apparatus of claim 18, wherein:
the request comprises an internet connectivity detection (ICD) request,
the communication comprises an ICD response, and
means for determining the characteristic of the communication link comprises:
means for determining an Internet connectivity based on the ICD response.

20. The apparatus of claim 18, wherein
the means for computing further comprises:
means for computing a target amount of time to receive the communication, and the means for terminating comprises:
means for terminating the communication when a duration of receiving the communication is greater than the target amount of time.

21. The apparatus of claim 18, further comprising:
means for estimating a round trip time to the server, wherein estimating comprises requesting a file from the server and measuring a response time,
wherein the target number of bytes is based on the round trip time.

22. The apparatus of claim 18, further comprising:
means for estimating a segment size used by a transport protocol,
wherein the target number of bytes is based on the segment size.

23. The apparatus of claim 18, further comprising:
means for determining a maximum estimation rate,
wherein the target number of bytes is based on the maximum estimation rate.

24. The apparatus of claim 18, further comprising:
means for determining a number of transport flows to use,
wherein the target number of bytes is based on the number of transport flows.

25. The apparatus of claim 18, further comprising:
means for determining a first ratio of an amount of time a transport protocol spends in a congestion avoidance mode to an amount of time the transport protocol spends in a slow start mode,
wherein the target number of bytes is based on the first ratio.

26. The apparatus of claim 18, further comprising:
means for generating the request for communication based on the target number of bytes,
wherein the request for the communication specifies a file size greater than the target number of bytes.

27. A non-transitory computer-readable medium comprising instructions, the instructions comprising:
one or more instructions that, when executed by a processor, cause the processor to:
determine, based on an access restriction including information associated with performing a Backhaul Quality Estimation (BQE), an allowability for accessing a server based on receiving, from the server, information indicating whether the server is available for BQE;
transmit, based on determining the allowability, a request for a communication from the server;
receive the communication from the server, over a communication link, in response to the request;

compute a target number of bytes of the communication to receive from the server while performing the BQE;

monitor an amount of the communication received from the server while performing the BQE;

terminate, based on monitoring the amount of the received communication, the communication when a received number of bytes exceeds the target number of bytes; and determine a characteristic of the communication link based on a portion of the communication received from the server before termination, the characteristic of the communication link including a BQE result, calculated based on a response from the server, and being used to determine a potential update to the access restriction.

28. The medium of claim 27, wherein:

the request comprises an internet connectivity detection (ICD) request, the communication comprises an ICD response, and the instructions further comprise:

one or more instructions to determine a suitability of the communication link by determining an Internet connectivity based on the ICD response.

29. The medium of claim 27, wherein the one or more instructions to compute the target number of bytes comprise:

one or more instructions to compute a target amount of time to receive the communication, and the one or more instructions to terminate the communication comprise:

one or more instructions to terminate the communication when a duration of receiving the communication is greater than the target amount of time.

30. The medium of claim 27, wherein the instructions further comprise:

one or more instructions to estimate a round trip time to the server, wherein one or more instructions to estimate a round trip time comprise:

one or more instructions to request a file from the server; and one or more instructions to measure a response time, wherein the target number of bytes is based on the round trip time.

31. The medium of claim 27, wherein the instructions further comprise:

one or more instructions to estimate a segment size used by a transport protocol, wherein the target number of bytes is based on the segment size.

32. The medium of claim 27, wherein the instructions further comprise:

one or more instructions to determine a maximum estimation rate, wherein the target number of bytes is based on the maximum estimation rate.

33. The medium of claim 27, wherein the instructions further comprise:

one or more instructions to determine a number of transport flows to use, wherein the target number of bytes is based on the number of transport flows.

34. The medium of claim 27, wherein the instructions further comprise:

one or more instructions to determine a first ratio of an amount of time a transport protocol spends in a congestion avoidance mode to an amount of time the transport protocol spends in a slow start mode, wherein the target number of bytes is based on the first ratio.

35. The medium of claim 27, wherein the instructions further comprise:

one or more instructions to generate the request for communication based on the target number of bytes, wherein the request for the communication specifies a file size greater than the target number of bytes.

* * * * *